United States Patent [19]
Takahashi et al.

[11] Patent Number: 5,138,704
[45] Date of Patent: Aug. 11, 1992

[54] DATA PROCESSING APPARATUS HAVING A PARALLEL ARRANGEMENT OF DATA COMMUNICATION AND DATA COMPUTATION

[75] Inventors: Junichi Takahashi, Ebina; Takashi Kimura, Machida, both of Japan

[73] Assignee: Nippon Telegraph and Telephone Corporation, Tokyo, Japan

[21] Appl. No.: 608,030

[22] Filed: Oct. 31, 1990

Related U.S. Application Data

[63] Continuation of Ser. No. 125,400, Nov. 25, 1987, abandoned.

[30] Foreign Application Priority Data

Nov. 27, 1986 [JP] Japan .................... 61-280848

[51] Int. Cl.⁵ .............. G06F 15/80; G06F 13/00
[52] U.S. Cl. .................... 395/325; 395/800;
364/DIG. 1; 364/228.3; 364/229.1; 364/231.9; 364/243.6
[58] Field of Search ............... 364/200, 900

[56] References Cited

U.S. PATENT DOCUMENTS

| | | | |
|---|---|---|---|
| 4,303,988 | 12/1981 | Tsuboka et al. ........ | 364/900 |
| 4,314,333 | 2/1982 | Shibayama et al. ..... | 364/200 |
| 4,504,909 | 3/1985 | Acharya et al. ........ | 364/900 |
| 4,546,431 | 8/1985 | Horvath ................ | 364/200 |

*Primary Examiner*—Gareth D. Shaw
*Assistant Examiner*—Matthew C. Fagan

[57] ABSTRACT

A control method for processing elements (PE) in a parallel processing system, such as an array processor, in which data processing is carried out with data transfer between the PEs, and wherein the data transfer between the PEs is performed simultaneously with the data operations in the PEs to improve the processing speed of the parallel processing system. Three buffer memories are respectively connected to a data input path from one data procesing apparatus, a data output path to another data processing apparatus, and data paths for transmitting data from or to the data operation unit in the data processing apparatus itself having these three buffer memories. Connections between these buffer memories and the data paths are switched, in such a manner that one of these buffer memories is connected to the external data input path from one data processing apparatus, while the other two buffer memories, are connected to the data output path to another data processing apparatus and the data paths from or to the data operation unit, respectively. When receiving data in the buffer memory connected to the data input path from one data processing apparatus, the buffer memory connected to the data output path transmits data to another data processing apparatus, and the buffer memory connected to the data paths from or to the data operation unit sends data to this unit and receives the operation results from this unit.

3 Claims, 25 Drawing Sheets

FIG. 4B
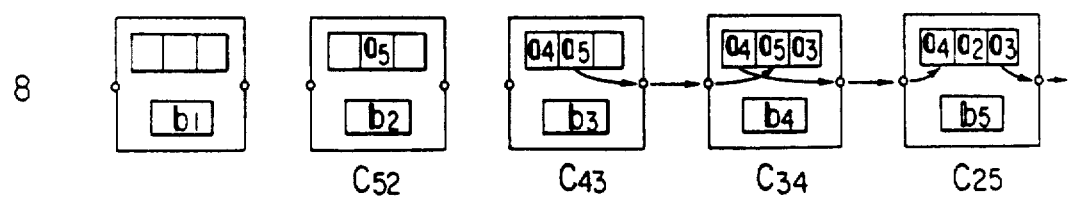
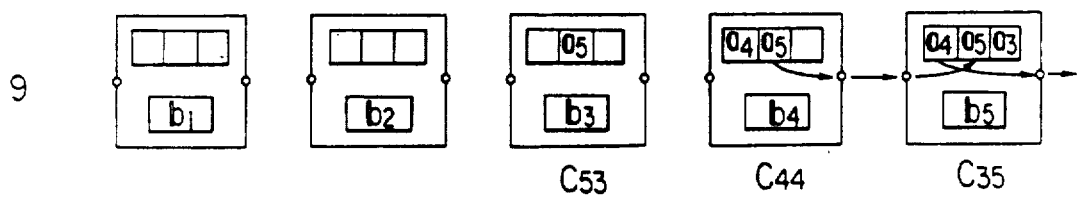
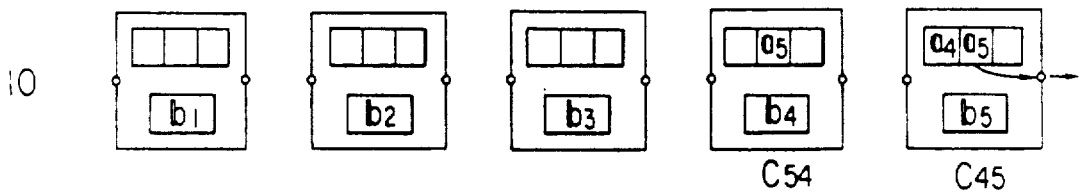
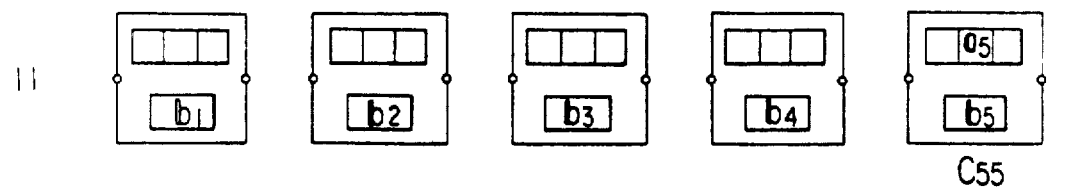

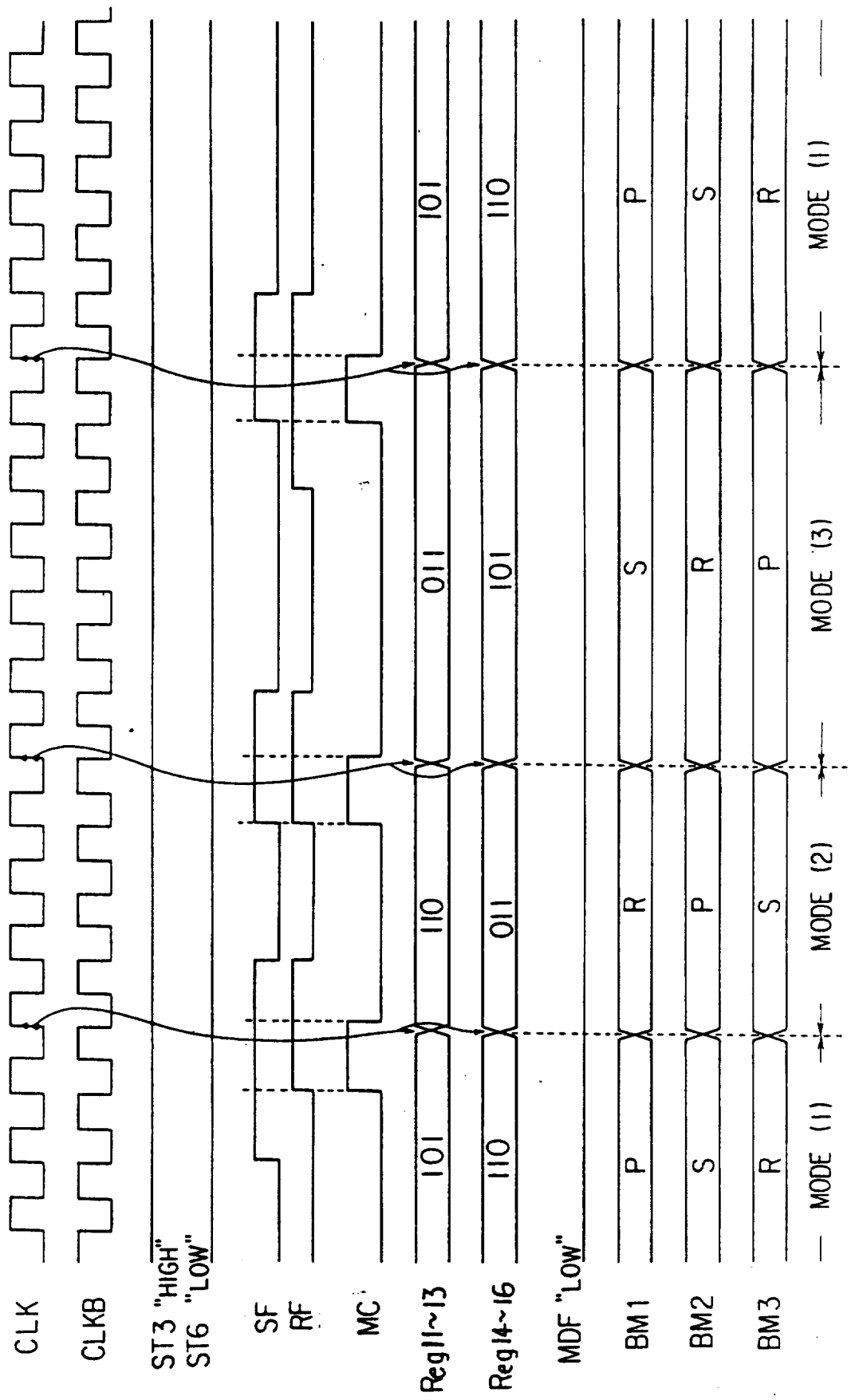

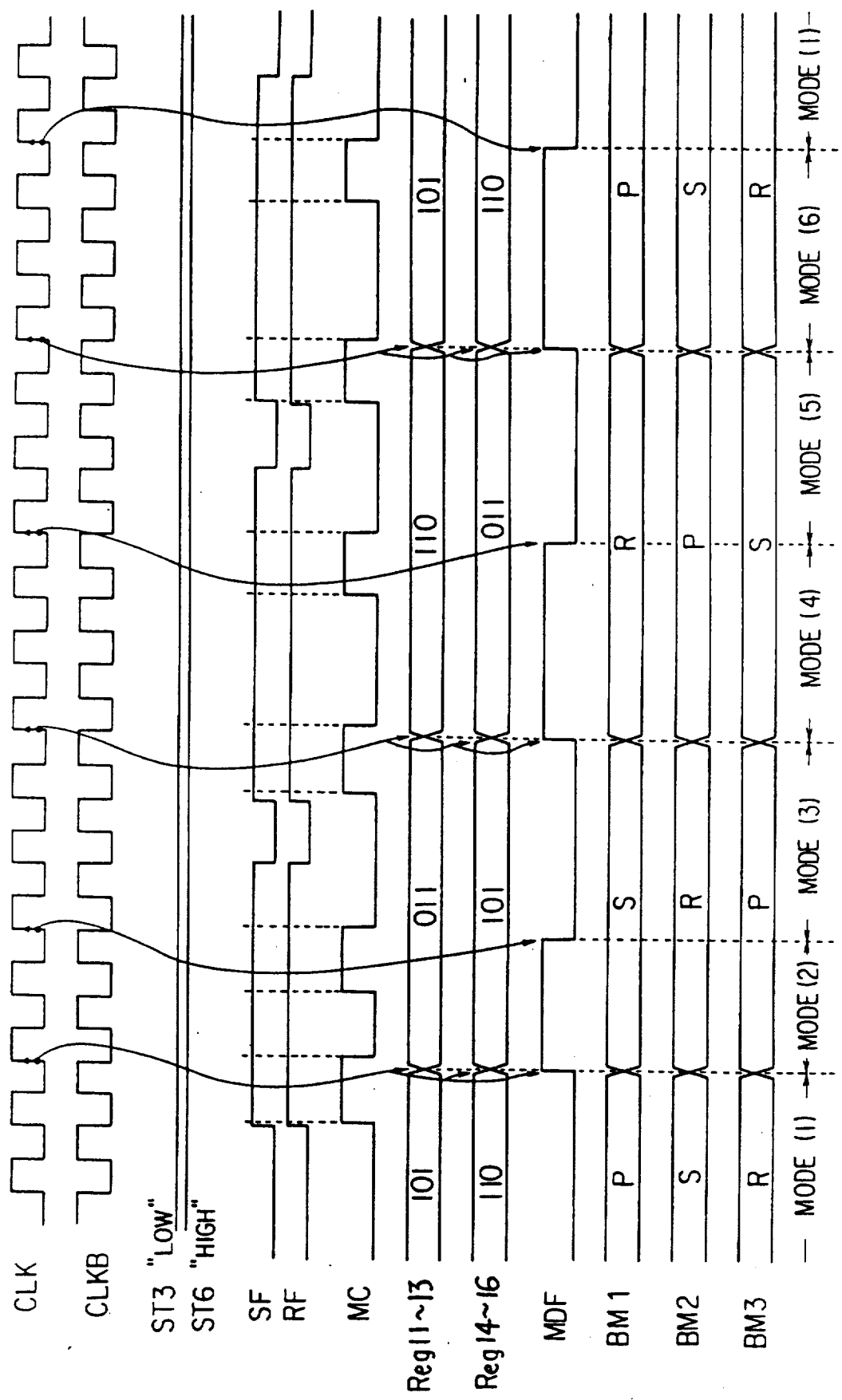

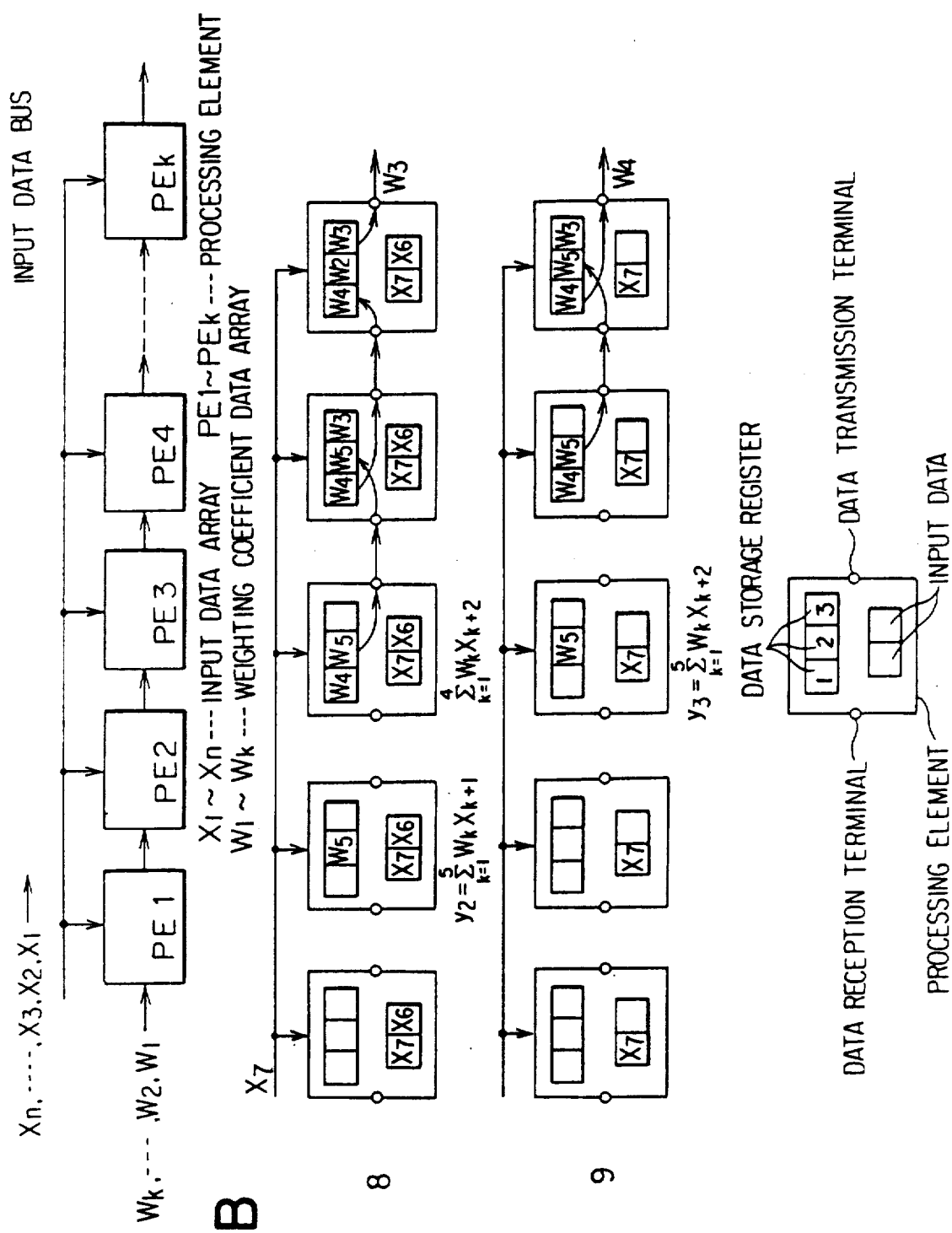

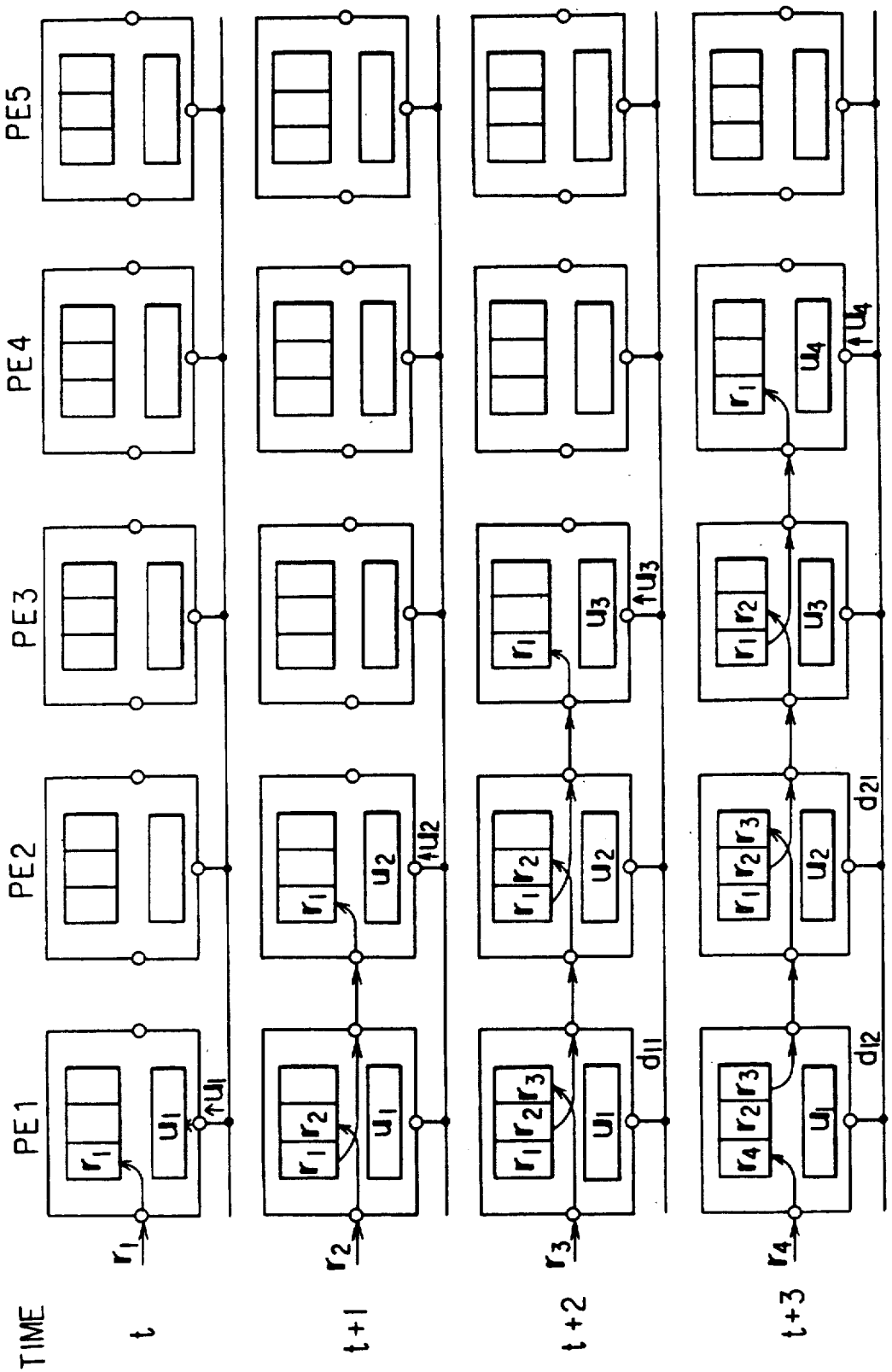

FIG. 15
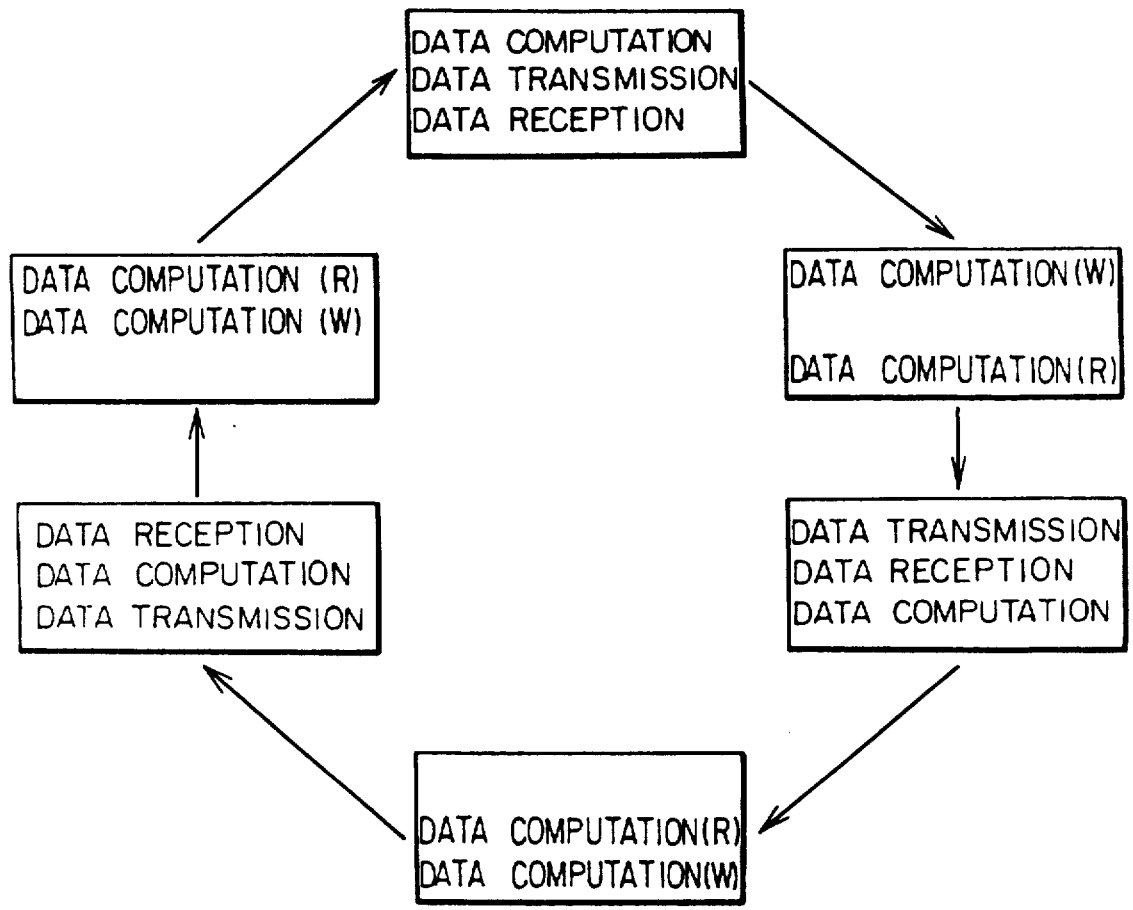
(NOTE 1)  DATA COMPUTATION (W) : WRITE ONLY MODE
IN DATA COMPUTATION MODE
DATA COMPUTATION (R) : READ ONLY MODE
IN DATA COMPUTATION MODE
(NOTE 2)
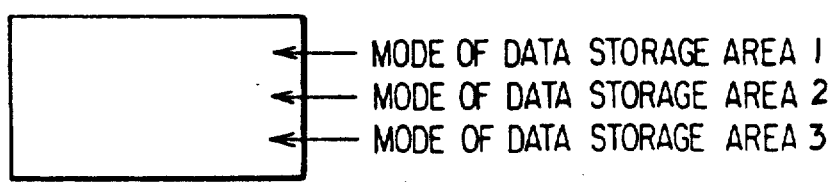

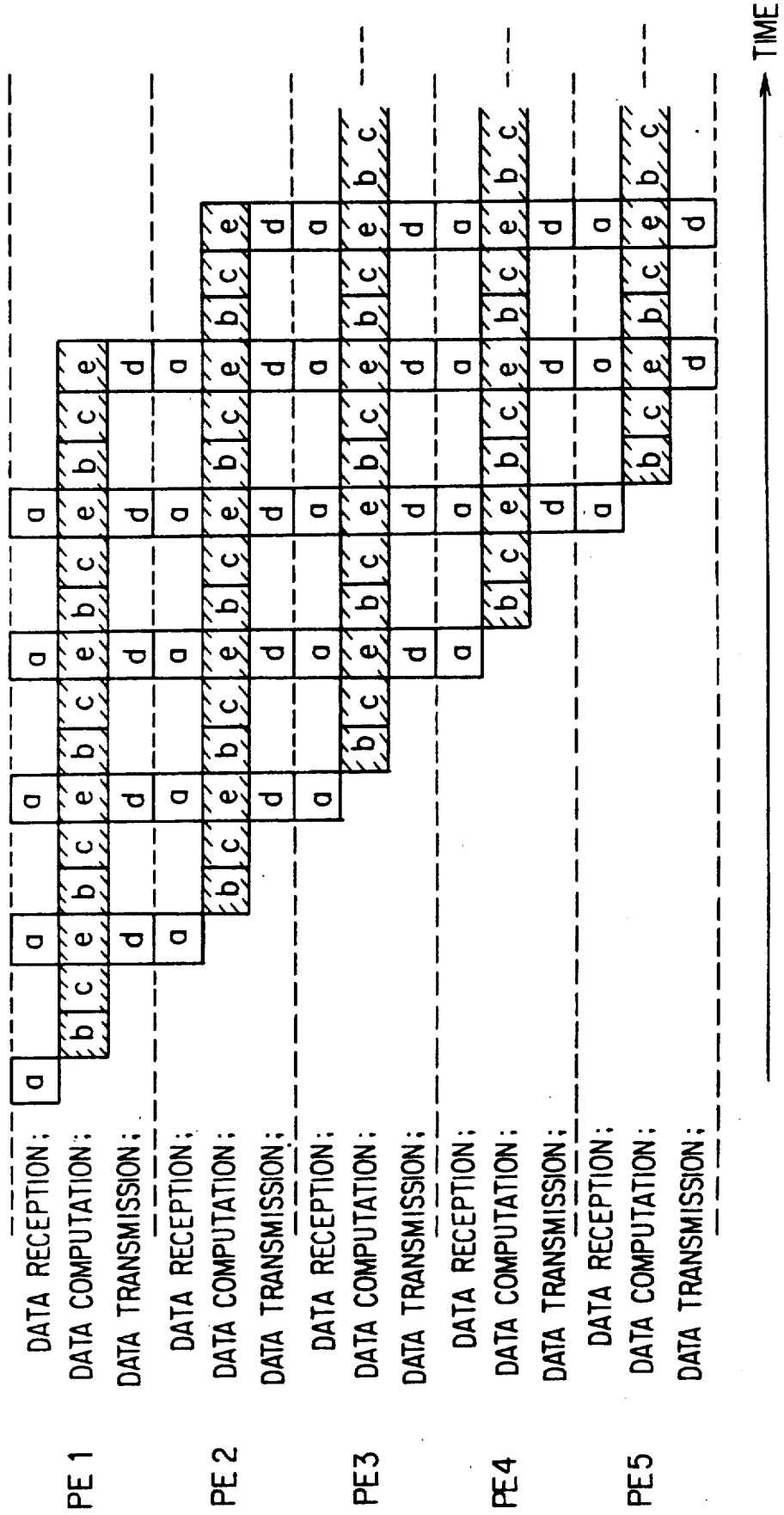

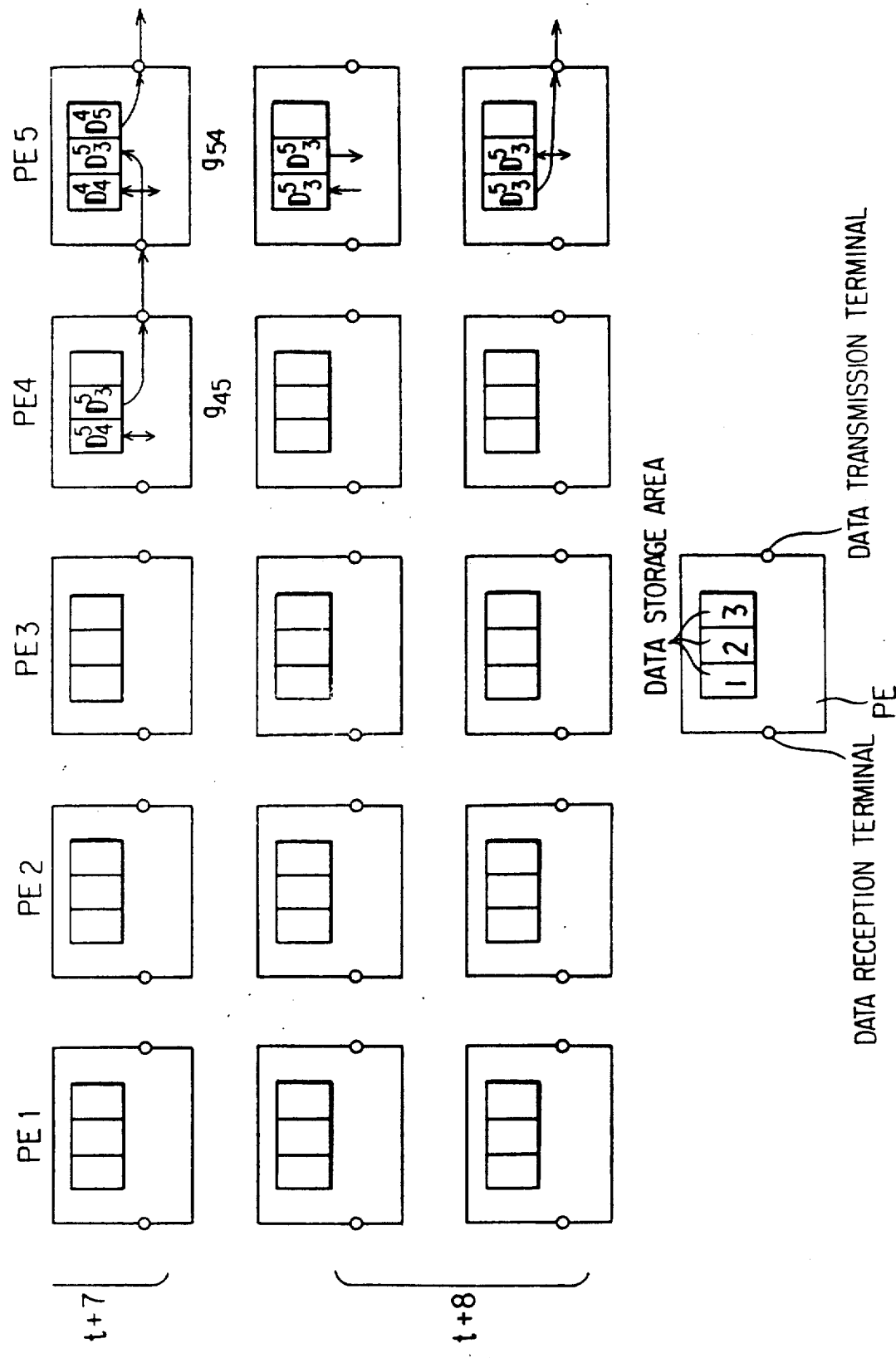

DATA PROCESSING APPARATUS HAVING A PARALLEL ARRANGEMENT OF DATA COMMUNICATION AND DATA COMPUTATION

This is a continuation of copending application(s) Ser. No. 07,125,400 filed on Nov. 25, 1987 now abandoned.

BACKGROUND OF THE INVENTION

1. Field of the Invention

The present invention relates to a technique for performing data transfer processing among data processing apparatuses in parallel with data computation in each data processing apparatus, in data processings of a system involving data communication among data processing apparatuses.

2. Brief Description of the Prior Arts

In data processing using an array processor as conventional data processing of a system involving data communication among data processing apparatuses, a common data storage area (memory) is used for data transfer (transmission/reception) processing among the processing elements as well as data computation. Therefore, data computation must be executed after completion of data exchange among the processing elements.

For this reason, data transfer and data computation must be alternately and repetitively performed. In particular, in matrix multiplication processing involving vector data transfer, since the volume of data to be transferred is large, the processing time of the array processor is prolonged due to overhead of data transfer among the processing elements.

For example, a case will be described wherein multiplications of matrices A and B are executed in an array processor shown in FIG. 1.

Processing elements have common data storage areas for reception and transmission of component data of the matrix A and for data computation thereof, and data storage areas for reception of component data of the matrix B, for matrix B component data supply to the computation unit, and for reception of computation results therefrom.

If the (l,m) matrix A and the (m,n) matrix B are respectively defined as:

$$A = (|a_1|^t, |a_2|^t, \ldots, |a_i|^t, \ldots, |a_l|^t)^t; (1 \leq i \leq l)$$

$$B = (|b_1, |b_2, \ldots, |b_j, \ldots, |b_n); (1 \leq j \leq n)$$

A jth-column vector $|c_j$ in a matrix $C = A \times B$ is represented by:

$$|c_j{}^t = (c_{1j}, c_{2j}, \ldots, c_{ij}, \ldots, c_{lj})$$
$$= (|a_1 \cdot |b_j, |a_2 \cdot |b_j, \ldots, |a_i \cdot |b_j, \ldots |a_l \cdot |b_j)$$

where $|a_i$ and $|b_j$ are respectively a row vector and a column vector, and are respectively represented by:

$$|a_i = (a_{i1}, a_{i2}, \ldots, a_{ii}, \ldots, a_{im})$$

$$|b_j = \begin{pmatrix} b_{1j} \\ b_{2j} \\ \vdots \\ b_{ij} \\ \vdots \\ b_{mj} \end{pmatrix}$$

$|a_i{}^t$ represents a transposed vector of $a_i$ and symbol "$\cdot$" represents inner product computation, and for example:

$$|a_i \cdot |b_j = \sum_{K=1}^{m} a_{ik}b_{kj}$$

Therefore, a series of vector data $\{|a_i\}$ representing the matrix A and a series of vector data $\{|b_j\}$ representing the matrix B are input to the array processor in accordance with a data flow as shown in FIG. 1, so that the components of the matrix C can be computed by pipelined processing in each processing element.

FIGS. 2A, 2B, and 2C show of array processing when l = 5 and n = 5.

In this case, since the data storage areas are commonly used for data exchange and data computation, vector data transfer among the processing elements and inner product computation between vector data are serially performed.

For example, at time 3, a processing element PE1 receives data $|a_2$, and at the same time, transfers retained data $|a_1$ to a processing element PE2.

The processing element PE2 receives the data $|a_1$ from the processing element PE1 at that time, and externally receives vector data $|b_2$.

At time 4, the processing elements execute inner product computation of the data received at time 3. In the above processing, a time required for data transfer among the processing elements is prolonged, and high-speed processing cannot be achieved.

SUMMARY OF THE INVENTION

It is an object of the present invention to provide a data processing apparatus which performs data transfer between data processing apparatuses in parallel with data computation in each data processing apparatus to reduce the time required for data transfer between the data processing apparatuses, thereby achieving high-efficient parallel processing of a system.

A feature of the present invention resides in a data processing apparatus having three data storage means, such as registers and hereafter referred to as data storage areas which are used for data reception from a data processing apparatus, data transmission to a different data processing apparatus, and data computation for its won data processing apparatus, respectively, to achieve parallel processing of data transmission between the data processing apparatuses and data computation processing of each data processing apparatus.

Furthermore, another feature of the present invention resides in the control of these data storage areas of the data processing apparatus. In such control, a plurality of behavior modes are provided and are assigned to these three data storage areas in order to set operations such as data reception, data transmission, and data computation, in each data storage area. The behavior mode or operation of each data storage area is changed to use these three data storage areas efficiently for parallel processing of data transmission and data computation. For example, the combinations of the behavior modes of these three data storage areas are sequentially changed between data reception, data computation and data transmission. In every combination of the behavior modes, all roles for parallel processing of data transmission between data processing apparatuses and data computation of each data storage areas.

Accordingly, parallel processing of data transmission and data computation is efficiently carried out using the present invention which is characterized by the data processing apparatus having three data storage areas and the control means to assign appropriate roles to each data storage area in sequential stages of operation.

BRIEF DESCRIPTION OF THE DRAWINGS

FIGS. 4A and 4B respectively show an arrangement of an array its processing operation for the multiplication processing of matrices using the present invention in the same arrangement of array processor of FIG. 1;

FIG. 10 shows a timing chart of three-state cyclical mode transition control of the Mode Control circuit;

FIG. 11 shows a timing chart of six-state cyclical mode transition control of the Mode Control circuit;

FIG. 12 and FIGS. 13A and 13B respectively show an arrangement of an array processor and snapshots of its array processing for explaining an embodiment of the present invention in convolution computation;

FIGS. 14A, 14B, and 14C show processing flows of vector distance calculation of Dynamic Time Warping in speech recognition;

FIG. 15 shows six-state cyclical mode transition control of a control method in the arrangement of the present invention shown in FIG. 5;

FIG. 16B shows a parallel processing flow of cumulative distance calculation of a linear array processor; and FIGS. 17A, 17B, 17C, 17D and 17E show parallel processing flows of cumulative calculation executed by the arrangement of the present invention.

PREFERRED EMBODIMENTS OF THE INVENTION

The present invention will be described in detail with reference to drawings illustrating embodiments of the present invention.

Embodiment 1

A case will be described wherein multiplications of a (l,m) matrix A and a (m,n) matrix B are processed using a linear array processor.

The matrices A and B are respectively defined as:

$$A = (|a_1^t, |a_2^t, \ldots, |a_i^t, \ldots, |a_l^t)^t; \quad (1 \leq i \leq l)$$

$$B = (|b_1, |b_2, \ldots, |b_j, \ldots, |b_n); \quad (1 \leq j \leq n)$$

where $|a_i$ and $|b_j$ are respectively a row vector and a column vector and are respectively represented by:

$$|a_i = (a_{i1}, a_{i2}, \ldots, a_{ii}, \ldots, a_{im})$$

$$|b_j = \begin{pmatrix} b_{1j} \\ b_{2j} \\ \cdot \\ \cdot \\ \cdot \\ b_{ij} \\ \cdot \\ \cdot \\ \cdot \\ b_{mj} \end{pmatrix}$$

$|a_i^t$ represents a transposed vector of $a_i$.

If a (i,j) component of a matrix $C = A \times B$ is represented by $c_{ij}$, $$c_{ij} = \sum_{k=1}^{m} a_{ik} b_{kj} = |a_i \cdot |b_j \quad (\cdot \text{ is inner product}).$$

product).

If a jth-column vector in the matrix C is defined by:

$$|c_j = (c_{1j}, c_{2j}, \ldots, c_{ij}, \ldots, c_{lj}); \quad (1 \leq j \leq n)$$

then $$|c_j = (|a_1 \cdot |b_j, |a_2 \cdot |b_j, \ldots, |a_i \cdot |b_j, \ldots, |a_l \cdot |b_j)$$

Figure 1:
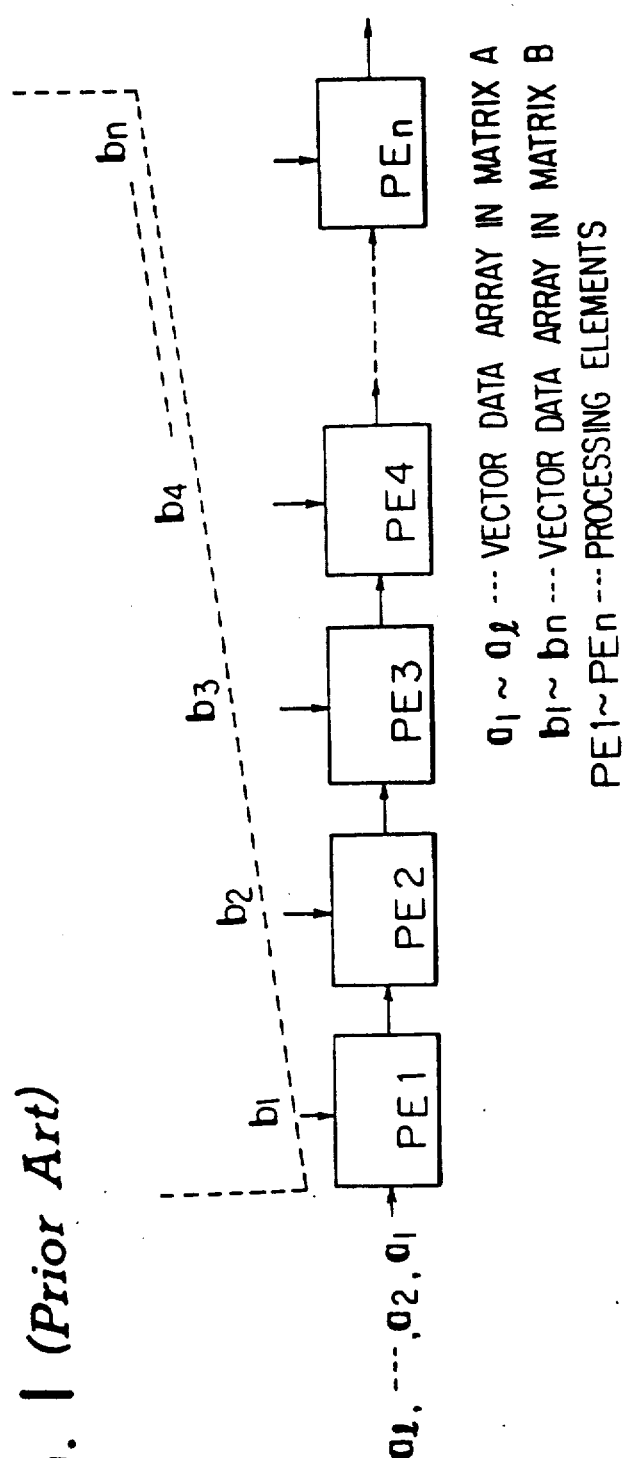
FIG. 1 and FIGS. 2A, 2B, and 2C respectively show an arrangement of a conventional array processor and its processing operation.
Figure 2A:
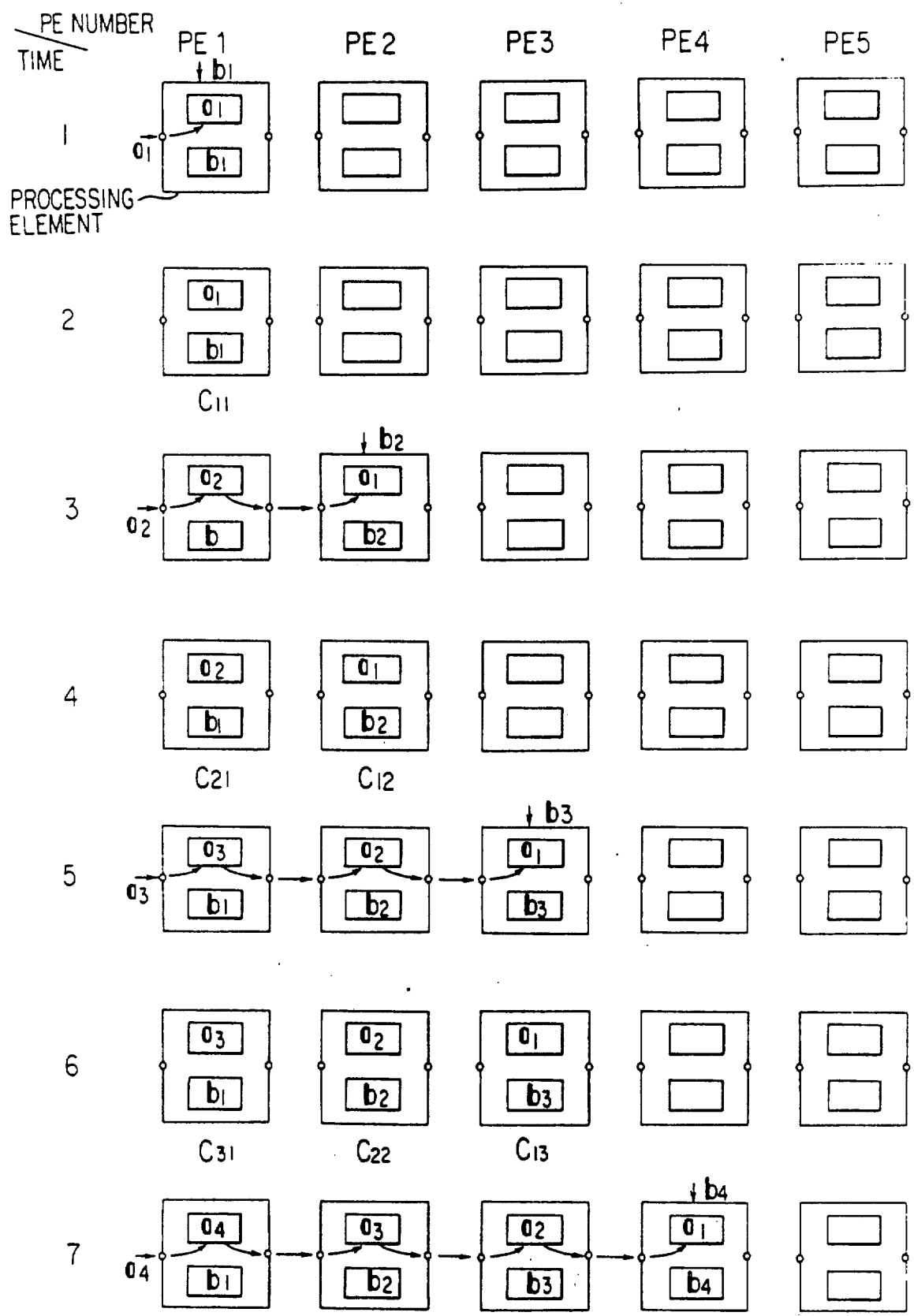
Figure 2B:
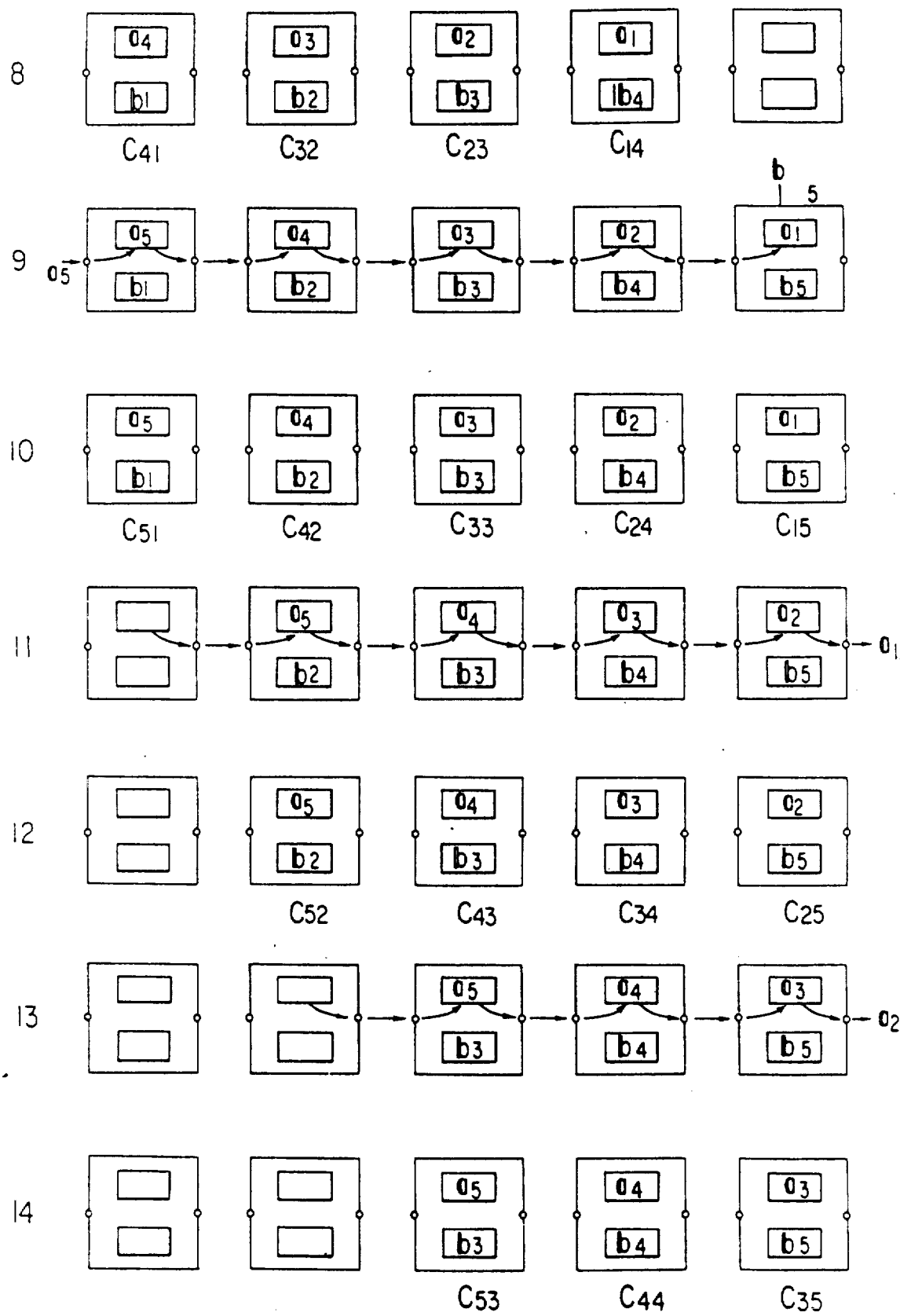
Figure 2C:
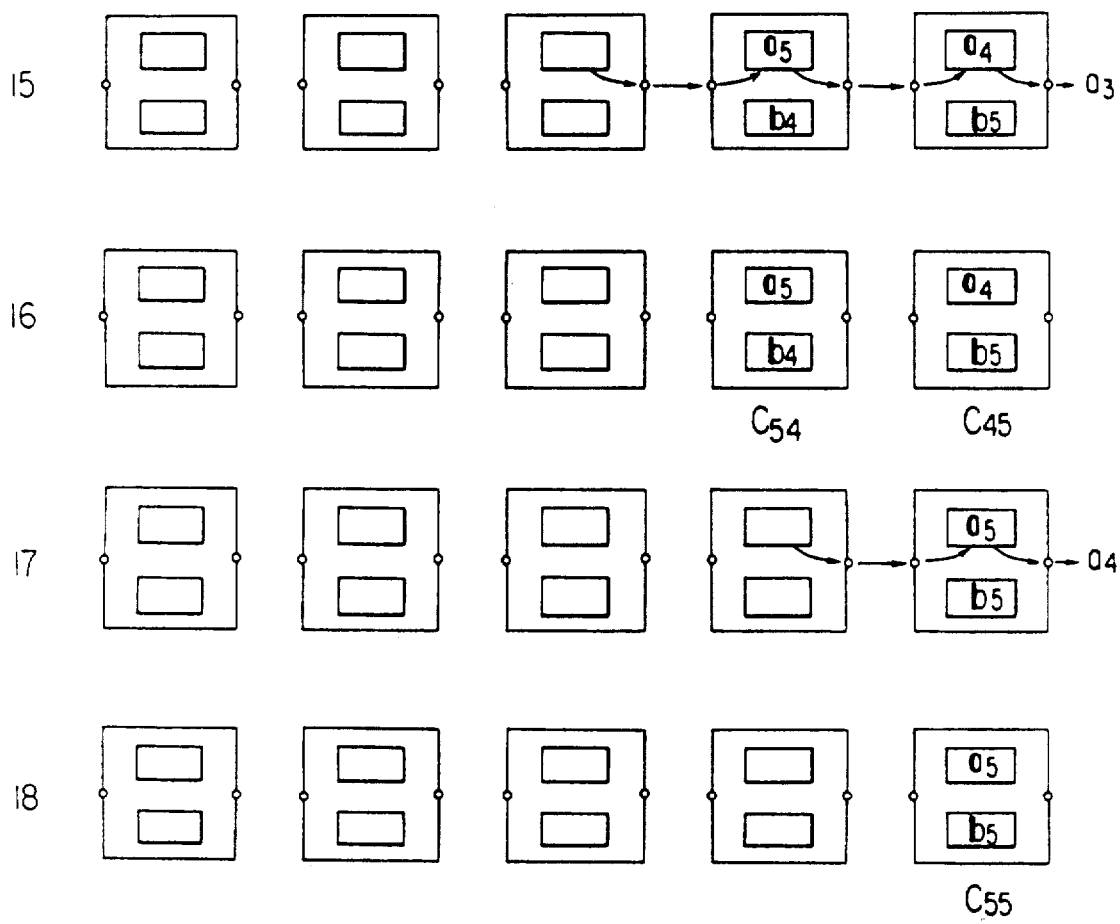
Figure 3:
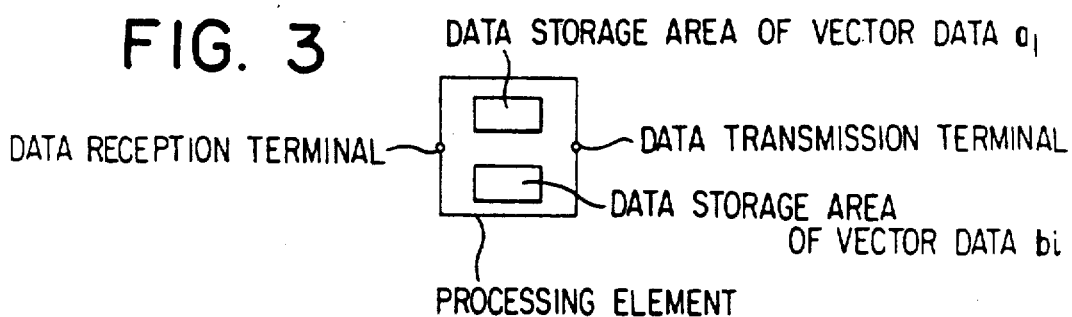
FIG. 3 is an explanatory figure of the processing elements of FIGS. 2A, 2B and 2C.
Figure 4A:
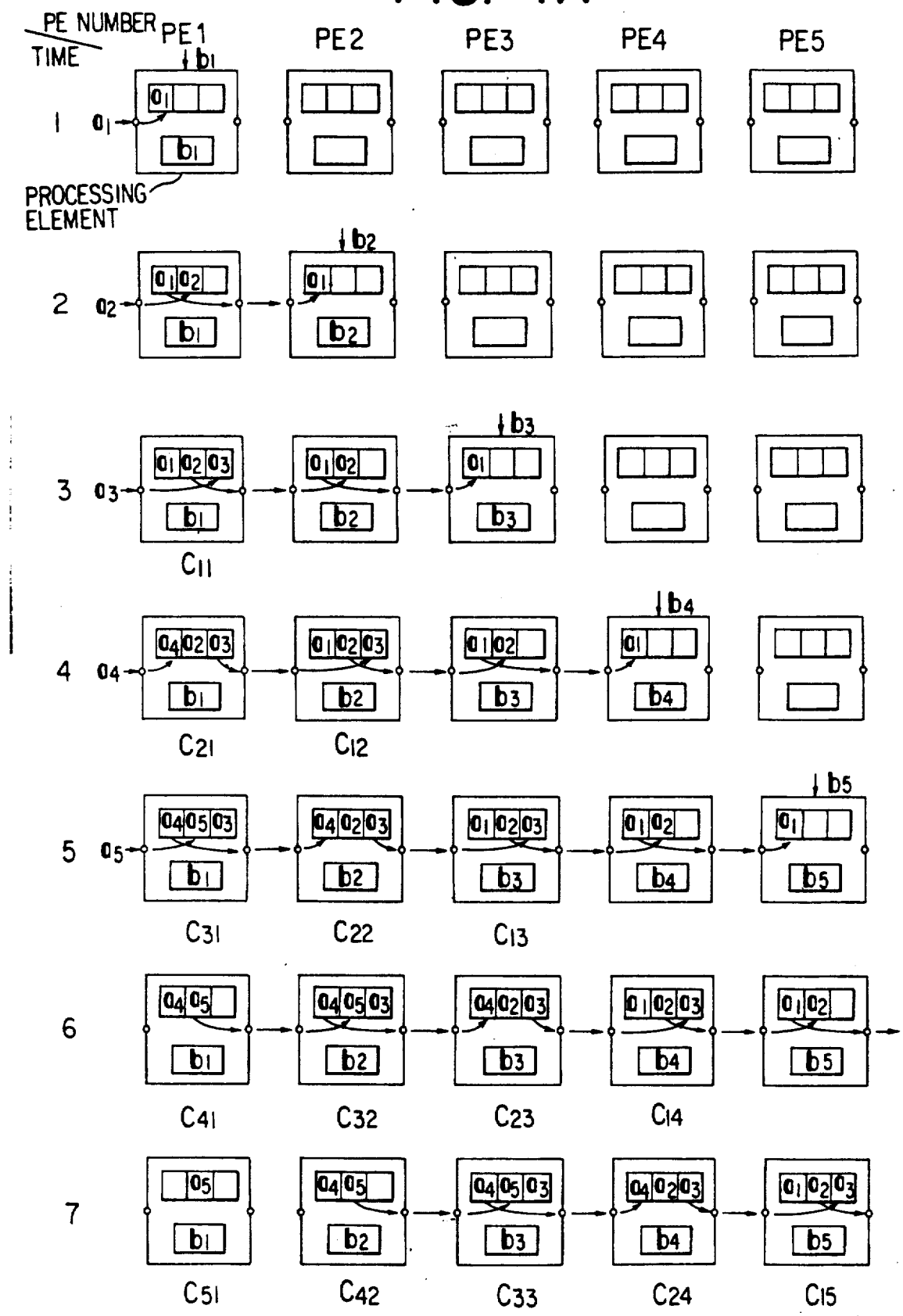

FIGS. 4A and 4B show snapshots of array processing when a linear array processor consisting of n processing elements shown in FIG. 1 computes the matrix C in the case of l=n=5. Data input to the array processor include a series of vectors ($|a_1, |a_2, \ldots, |a_l$), and a series of vector data ($|b_1, |b_2, \ldots, |b_n$).

Figure 5:
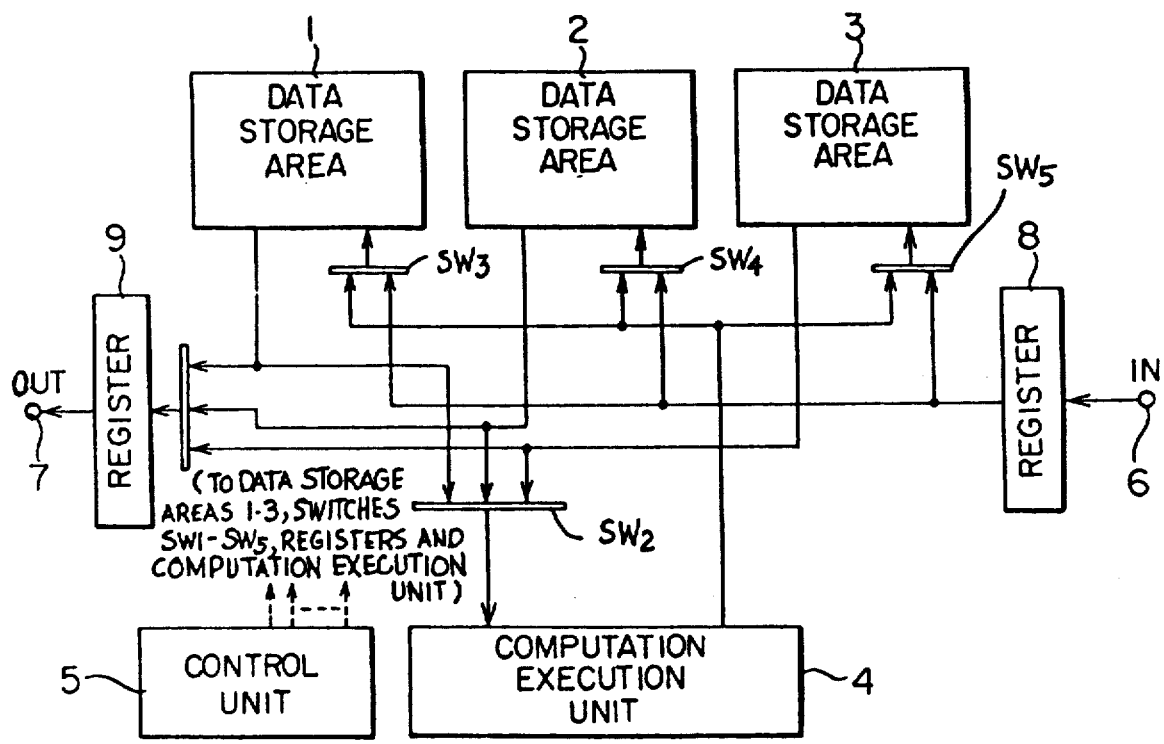
FIGS. 5 and 6 are respectively a block diagram schematically showing the embodiment of the present invention and a view showing a transition of three modes of a control method.

FIG. 5 is a block diagram schematically showing an embodiment in which the present invention is applied to the arrangement of the processing elements. Reference numerals 1, 2, and 3 denote data storage areas; 4, a computation unit; 5, a control unit; 6, a data reception terminal; 7, a data transmission terminal; and 8 and 9, registers.

Each processing element has data storage areas respectively used for data reception, data transmission, and data computation. The capacity of each data storage area corresponds to the size of each vector data, i.e., m data.

Each processing element has a data storage area for storing each vector data of the series of vector data (|b₁, |b₂, ... |bₙ) and intermediate computation results, and also has a means for executing inner product computation, and a means for controlling data exchange and data reception, data transmission, and data computation modes of the data storage areas.

In this configuration, data reception terminal 6 is connected to the first buffer register 8 wherein the input data from an external apparatus are stored in the first buffer register 8. The output of the second buffer register 9 is connected to data transmission terminal 7, wherein the stored data in the second buffer register 9 is transferred to a second, different external apparatus through data transmission terminal 7. All of the data storage areas 1, 2, and 3 have read and write functions. All of the data read-out ports of these data storage areas are connected with first and second switches $Sw_1$ and $Sw_2$ respectively. The first switch $Sw_1$ connects the data paths from the data storage area 1, 2, or 3 and its output is connected to the second buffer register 9. Accordingly, the data from one of these data storage areas are transferred to the external apparatus through data transmission terminal 7, via the second buffer register 9, and the first switch $Sw_1$. The second switch $Sw_2$ connects the data paths from the data storage areas and its output is connected to computation execution unit 4. Accordingly, the data from one of the data storage areas are transferred to computation execution unit 4 through the second switch $Sw_2$. The outputs of the first buffer register 8 and the computation execution unit 4 are connected to third, fourth, and fifth switches $Sw_3$, $Sw_4$ and $Sw_5$ respectively. The outputs of the third, fourth, and fifth switches are connected to the write-in ports of data storage areas 1, 2, and 3, respectively. Accordingly, one of these data storage areas receives the data from the external apparatus through the third, fourth, or fifth switches, and one of these data storage areas receives the computation results from the computation execution unit 4 through third, fourth, or fifth switches. Control unit 5 controls the read/write functions of data storage areas 1, 2, and 3, and controls the data path exchange of the first, second, third, fourth, and fifth switches $Sw_1$-$Sw_5$. Furthermore, control unit 5 controls the first and second buffer registers 8 and 9, and the computation execution unit 4. The computation unit 4 has arithmetic operation hardware, such as a Booth-type multiplier, a conventional adder and subtracter, and the like. Control unit 5 selects the functions of computation execution unit 4. Therefore, for example, data reception, data transmission, and data operation can be carried out in parallel, in that the first switch $Sw_1$ connects the data path from data storage area 1 to unit 4, the second switch $Sw_2$ connects the data path from data storage area 2 to register 9, the fourth switch $Sw_4$ corresponding to data storage area 2 connects the data path from computation execution unit 4 to storage area 2, and the fifth switch $Sw_5$ corresponding to data storage area 3 connects the data path from the first buffer register 8 to storage area 3. In this case, switch $Sw_3$ corresponding to data storage area 1 plays no role.

In the operation shown in FIGS. 4A and 4B, the processing elements perform parallel computations of the components of the matrix C in a regular data flow, in which the two kinds of vector data series are synchronously pipeline-transferred to the processing elements.

Figure 6:
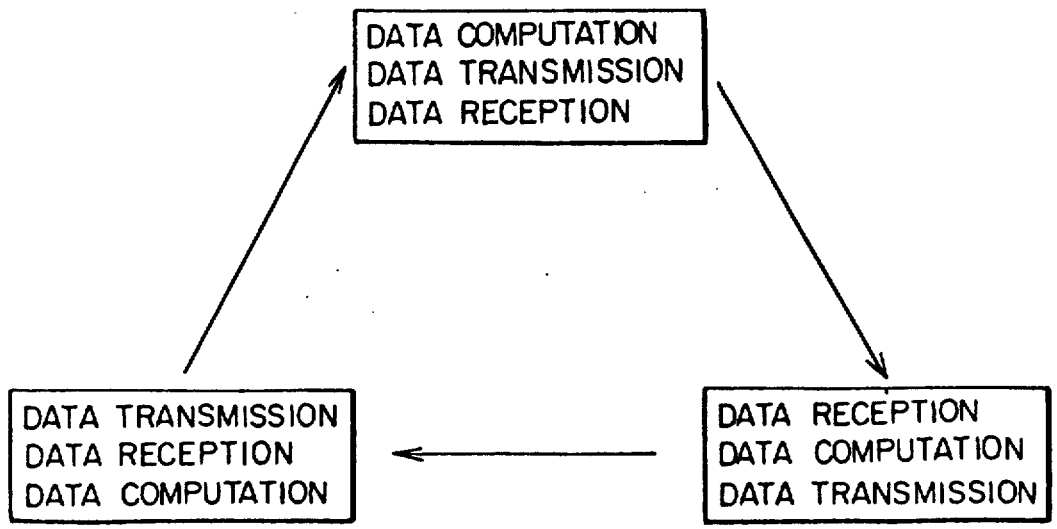

Each data storage area of each processing element is subjected to the cylindrical mode transition as shown in FIG. 6 at predetermined cycle. Note that a unit of time corresponds to a time required for calculating components of the matrix C or vector data transfer.

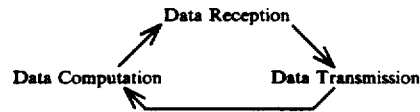

The processing of the three data storage areas of the processing element PE1 at times 3, 4, and 5 will be described in detail.

The data storage area in a data reception mode receives vector data |a₃ at time 3, and is switched to a data transmission mode at time 4. The data storage area transmits the data |a₃ to the processing element PE2. At time 5, the data storage area is switched to a data computation mode, and is used for inner product computation between the data |a₃ and vector data |b₁ input at time 1 and is held therein.

On the other hand, at time 3, the other two data storage areas respectively serve as a data storage area for inner product computation between vector data |a₁ and |b₁ (in the data computation mode), and a data storage area for data transmission for transmitting vector data |a₂ received at time 2 to the processing element PE2 (in the data transmission mode).

At time 4, the former data storage area serves as a data storage area for receiving vector data |a₄ (in the data reception mode), and the latter data storage area serves as a data storage area for inner product computation between the vector data |a₂ and |b₁ (in the data computation mode).

At time 5, the former data storage area serves to transfer vector data |a₄ to the PE2 (data transmission mode) and the latter data storage area serves to receive vector data |a₅ (data reception mode).

In the above processing of the matrix multiplications, since the data storage areas can be exclusively and cyclically switched in three modes, i.e., the data reception, data transmission, and data computation modes according to the present invention, inner product computation and data transfer among processing elements can be parallelly executed in the processing elements. The overhead of a time required for data transmission among the processing elements in the array processor can be reduced, thus achieving efficient processing.

The effect of this embodiment will be quantitatively evaluated.

The time required for inner product computation is given by $t_p$, the time required for transferring vector data |a_i or |b_j is given by $t_{tr}$, and the time required for initial loading which is necessary until computation is started in the entire array processor is given by $t_0$, the time T required for multiplication of the (l,m) matrix A and the (m,n) matrix B is represented by:

$$T = t_0 + (l + n + 1) \times \max \quad (1)$$

where max[x,y] represents the maximum values of the x and y values. If $t_p \geq t_{tr}$, equation (1) is rewritten as $T = t_0 + (l + n + 1)t_p$, data transfer time is very short as compared to computation time, and the total time depends on only the computation time.

If $t_p < t_{tr}$, equation (1) is rewritten as $T = t_0 + (l + n + 1)t_{tr}$, data computation time is very short as compared to data transfer time, and the total time depends on only the data transfer time.

In a means for serially executing computation and data transfer, i.e., the prior art in which a data storage area is commonly used for data transfer and data computation, and data transfer and data computation modes are executed in a time-divisional manner, a total time T' is represented by:

$$T' = t_0' + (l + n + 1) \times (t_p + t_{tr}) \quad (2)$$

From equations (1) and (2), $$\frac{T}{T'} \approx \frac{t_0' + (l + n + 1) \times (t_p + t_{tr})}{t_0 + (l + n + 1) \times \max[t_p, t_{tr}]} \quad (3)$$

Assuming that $t_0$ and $t_0'$ in the first terms of the denominator and numerator in equation (3) can be ignored as compared to the second terms, $$\frac{T}{T'} \approx \frac{t_p + t_{tr}}{\max[t_p, t_{tr}]} = \begin{cases} 1 + \frac{t_{tr}}{t_p} & (t_p \geq t_{tr}) \\ 1 + \frac{t_p}{t_{tr}} & (t_p < t_{tr}) \end{cases} \quad (4)$$

Therefore, from equation (4), $T \leq T'$, processing can be achieved by the arrangement of the present invention at higher speed than the conventional arrangement. If $t_p = t_{tr}$, the processing speed can be increased twice that in the conventional arrangement.

The control unit will be described hereinafter in detail.

Figure 7:
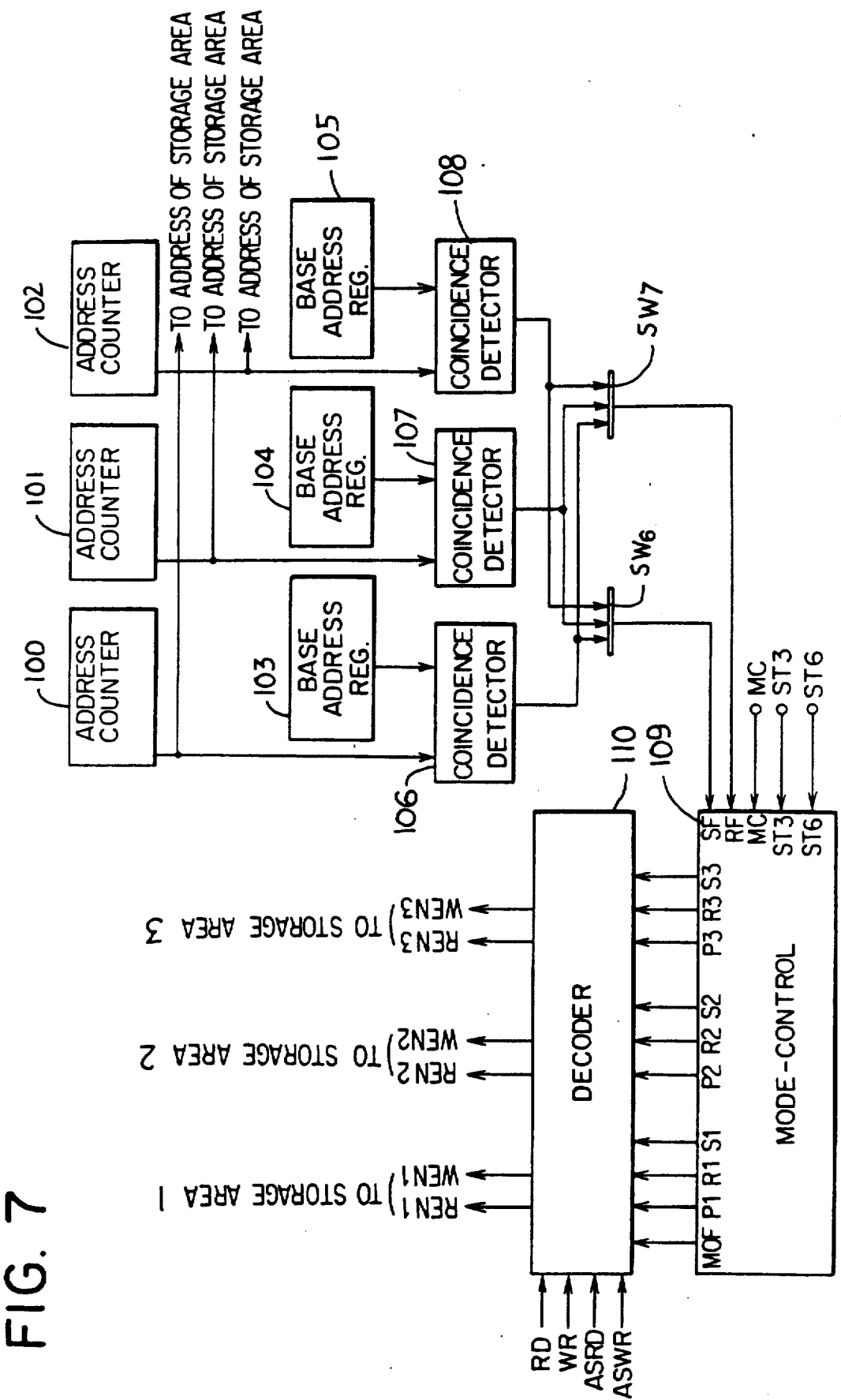
FIG. 7 is a block diagram of a control unit according to the embodiment of the present invention.

FIG. 7 is a block diagram of the control unit. Note that the common control unit is used in all the embodiments of the present invention. Address Counters 100, 101, and 102 respectively specify the location of data storage areas 1, 2, and 3, and Base Address Registers 103, 104, and 105 retain data to be compared with address values in these Address Counters 100, 101 and 102. The address value in the Address Counters 100, 101, and 102 is compared with the data in the corresponding Base Address Register 103, 104, and 105 through a corresponding coincidence detector 106, 107, and 108. Each coincidence detector 106, 107, and 108 generates a flag indicating a coincidence between the address values. The flag output from each coincidence detector 106, 107, and 108 can be defined as a flag representing whether data exchange operation is completed or not in the data storage areas 1, 2, and 3 for data transmission, data reception, and data computation. Each switch SW6–SW7 switches flags indicating the data transmission and reception states, and sends the selected flag as a transmission state flag (SF) or a reception state flag (RF) to a Mode Control circuit. The flag indicates that the operation of transmitting or receiving data is completed in the data storage area of data transmission or reception state. More specifically, an initial address in a data storage area 1, 2 and 3 of a data group to be transmitted or received is set in each Address Counter 100, 101, and 102, and a final address thereof is set in the corresponding Base Address Register 103, 104, and 105. The Counter increments the address each cycle data is transmitted or received. When the incremented value coincides with the value of the Base Address Register 103, 104, and 105, the Counter 100, 101, and 102 stops the increment operation. A coincidence flag is detected, and transmission or reception is completed.

The Mode Control circuit 109 controls the modes of the respective data storage areas. A control signal MC (Mode Change Signal) is used for starting cyclical mode transition control of the data storage areas. ST3 and ST6 represent control signals of three-state cyclical mode transition and six-state cyclical mode transition (to be described later), respectively. Control signals $P_n$, $R_n$, and $S_n$ (n = 1, 2, 3) respectively indicate the data computation, data reception, and data transmission mode of the data storage area (if n = 1, data storage area 1; if n = data storage area 2, ②; and if n = data storage area 3, ③). A control signal MDF is used for six-state cyclical mode transition control.

A Decoder circuit 110 generates data read and write enable signals $REN_n$ and $WEN_n$ (n = 1, 2, 3) in accordance with the control signals indicating the mode of the individual data storage areas from the Mode Control circuit 109 control signals WR and RD indicating write and read operations of the data storage areas during data computation, and control signals ASWR and ASRD indicating write and read operations during data transmission/reception.

Figure 8:
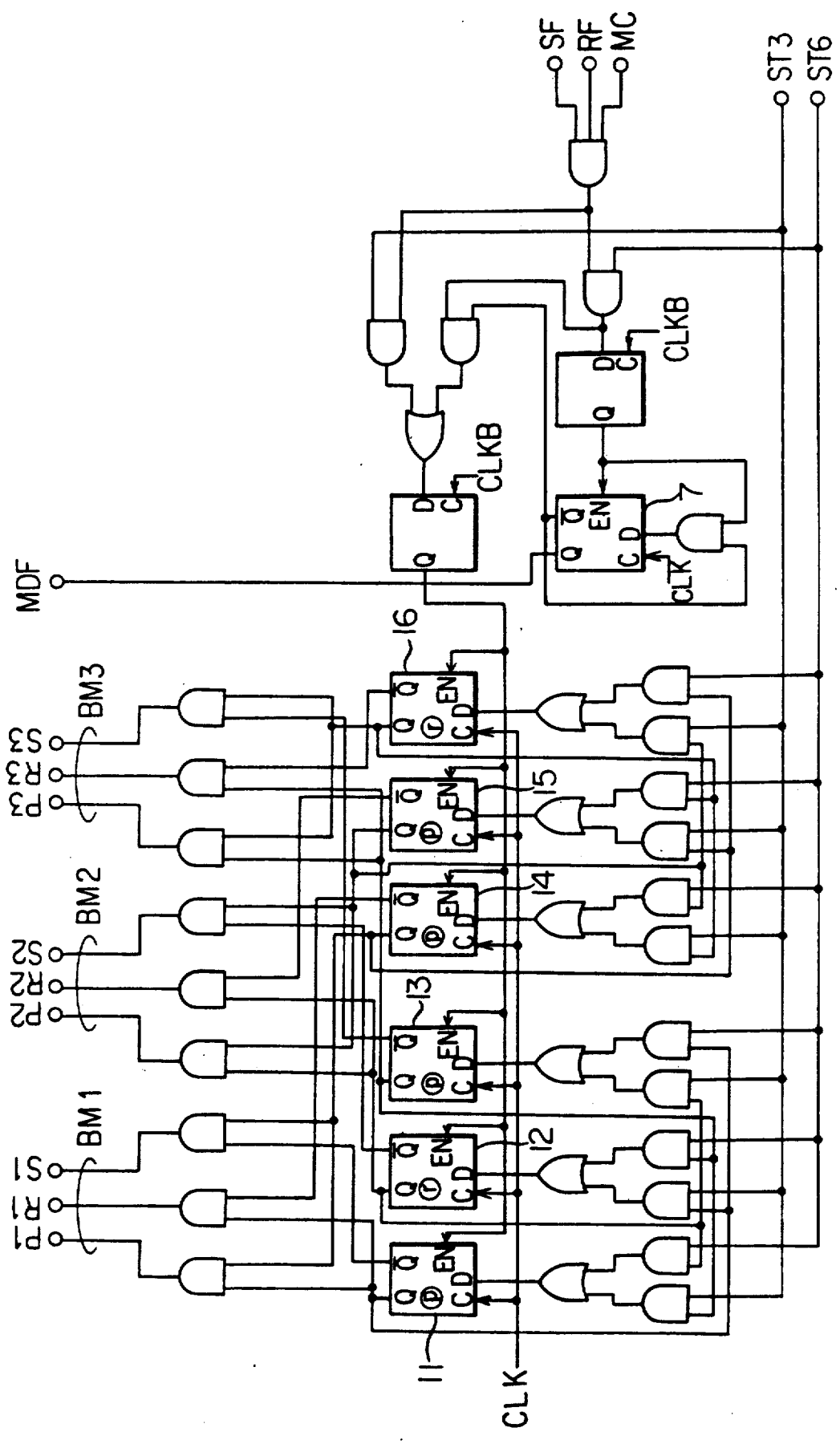
FIG. 8 is a logic circuit of a Mode Control circuit shown in FIG. 7 according to the embodiment of the present invention.

FIG. 8 is a logic circuit diagram of the Mode Control circuit.

$BM_n$ (n = 1, 2, 3) represents the mode of each data storage area, in which one of $P_n$, $S_n$, and $R_n$ (n = 1, 2, 3) is the logical "High". Registers 11 to 16 constitute a register group for controlling mode values of the data storage areas 1, 2, and 3. The mode of the data storage area 1 is defined by the register values of the registers 11 and 14, the mode of data storage area 2 is defined by the register values of the registers 12 and 15, and the mode of data storage area 3 is defined by the register values of the registers 13 and 16 (for data computation mode, "11", for data reception mode, "10", and for data transmission mode, "01"). In this registered group, ⑨ indicates a register for holding an initial value "1", and ⓡ indicates a register for holding "0" upon resetting. The registers 11 to 13 and the registers 14 to 16 serve as cyclical shift registers to generate the mode codes (for data computation, "11", for data reception mode, "10", for data transmission mode, −01), which are represented by the values of registers, 11 and 14, 12 and 15, and 13 and 16.

Figure 9:
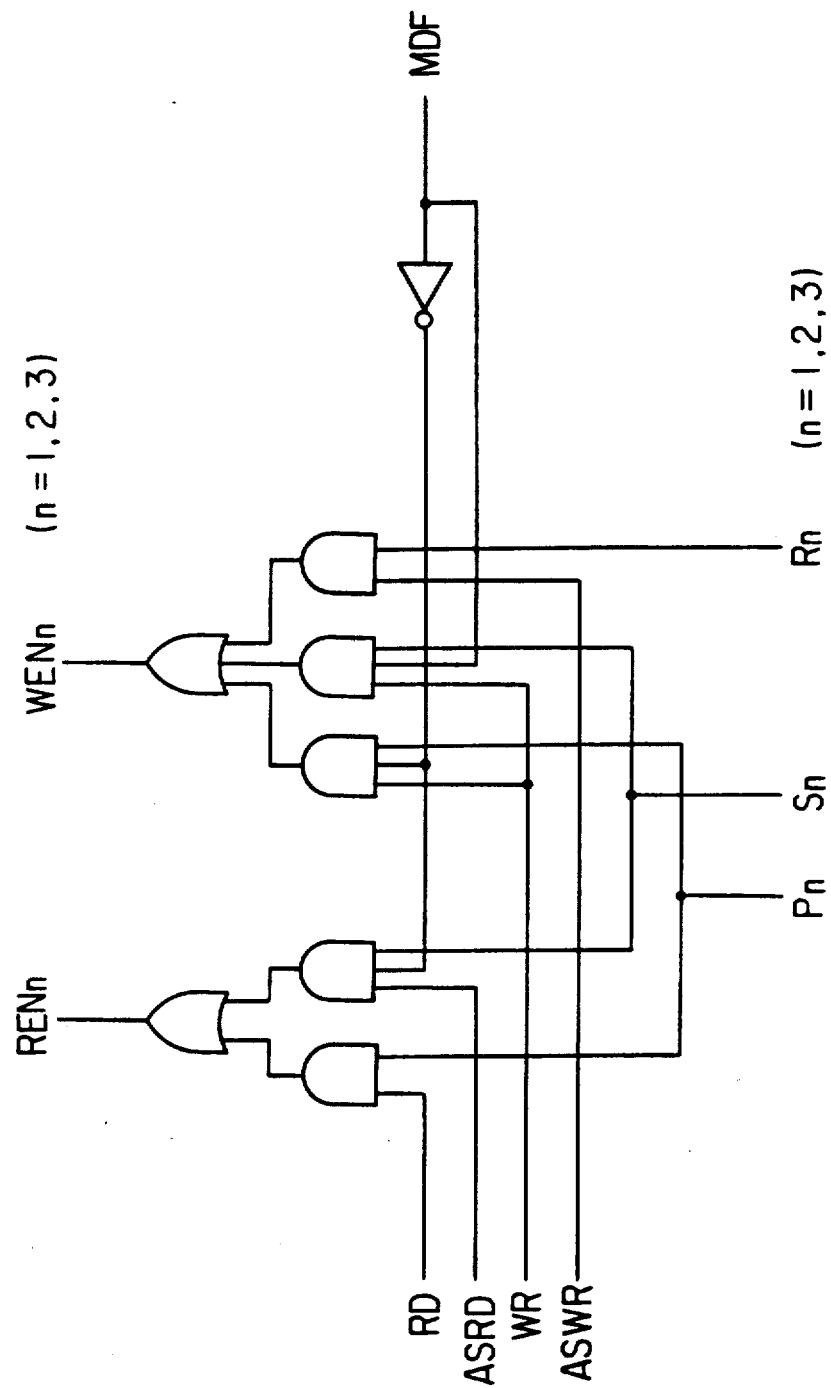
FIG. 9 is a logic circuit of a decoder shown in FIG. 7 according to the embodiment of the present invention.

FIG. 9 is a logic circuit diagram of the Decoder circuit, and FIGS. 10 and 11 are timing charts of operations of the Mode Control circuit in three-state cyclical mode transition control and six-state cyclical mode transition control, respectively.

In FIG. 10, the shift registers indicating the mode values of the data storage areas perform a shift operation each cycle the control signal MC is input for one machine cycle, and the signals $BM_n$ (n = 1, 2, 3) indicating the modes of the data storage areas are exclusively changed, thus realizing three-state cyclical mode transition control.

In FIG. 11, the shift registers indicating the mode values of the data storage areas perform a shift operation once each cycle the control signal MC is input for two machine cycles, and the control signal MDF is set or reset each cycle the control signal of one machine cycle is input. When the control signal MDF is the logical "Low", the modes of the data storage areas are defined by the values of the signals $BM_n$ (n=1, 2, 3). When the signal MDF is the logical "High", the mode of the data storage area of $BM_n = P_n$ is defined as a data read-only mode for data computation, and the mode of the data storage area of $BM_n = S_n$ is defined as a data write-only mode for data computation, so that the signal MC switches, for each machine cycle, a state wherein the two data storage areas are assigned to the read and write-only modes for data computation, and a state wherein the data storage areas are respectively assigned to the data computation, reception, and transmission modes, thereby realizing six-state cyclical mode transition control.

Embodiment 2

A case will be described wherein convolution computation is executed using a linear array processor.

If a series of weighting coefficient data is given as $W = \{w_1, w_2, \ldots, w_k\}$, and a series of input data is given as $X = \{x_1, x_2, \ldots, x_n\}$, convolution computation is represented as:

$$y_i = w_1 x_i + w_2 x_{i+1} + \ldots + w_k x_{i+k-1}$$

FIG. 5 shows an arrangement of the present invention for this embodiment. Each processing element has an arrangement shown in FIG. 5. In this case, data storage areas used for data reception, data transmission, and data computation modes are registers.

Figure 13A:
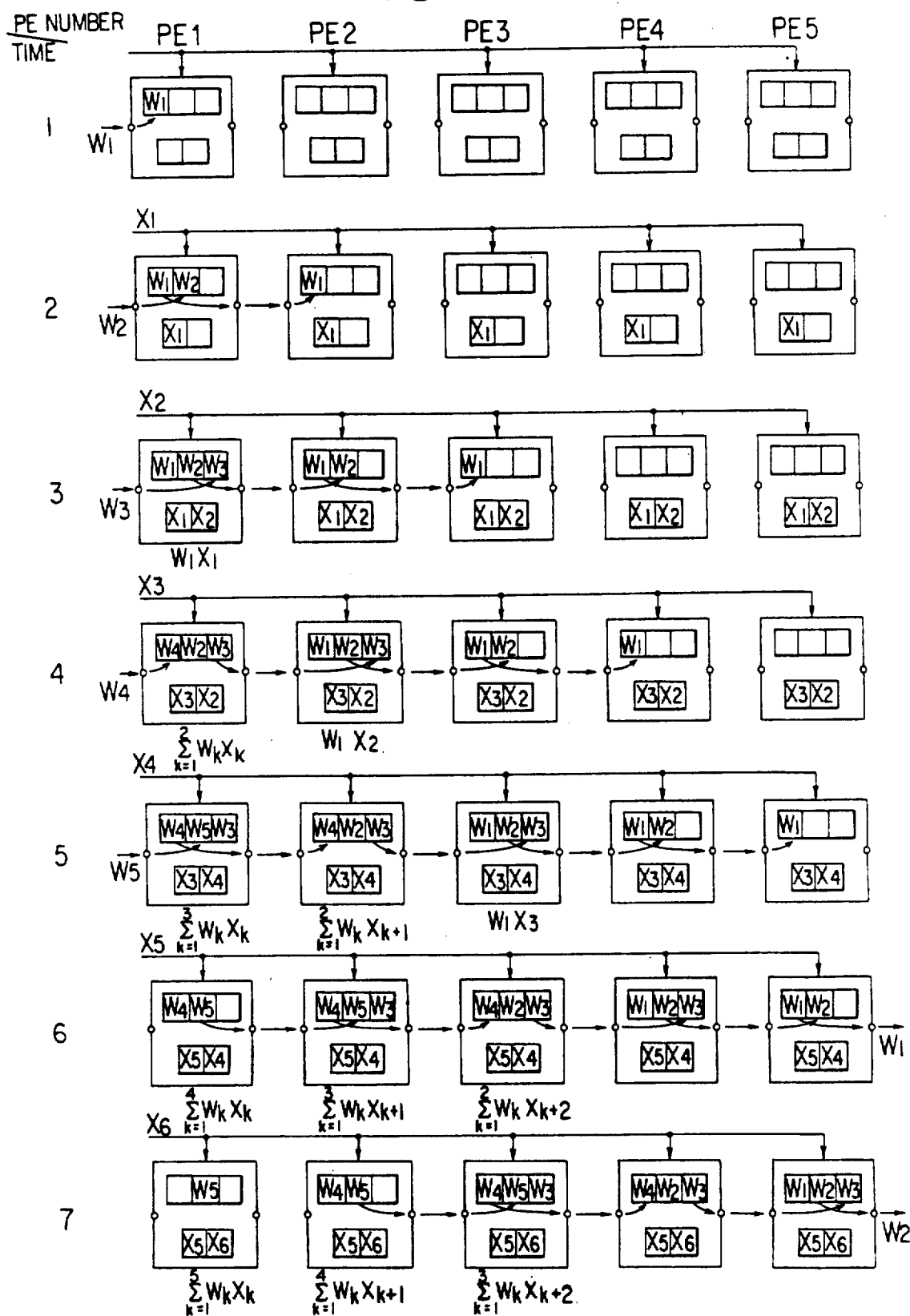

An operation of convolution computation in a linear array processor consisting of k processing elements shown in FIG. 12 will be described in FIGS. 13A and 13B in the case of k=5 and n=7.

Each processing element has the data storage areas used for the above three modes (in this embodiment, since each data is scalar data, each data storage area can be a register), and also has a control means for controlling multiplication and addition functions, the processing modes of the data storage areas, and data exchange.

Each processing element has a data storage area for input data X. This storage area is assumed to be simultaneously used for data input from the adjacent processing element and data computation.

In addition, each processing element is assumed to have a means for storing and holding intermediate computation results.

The data storage registers can be exclusively and cyclically switched between data reception, data transmission, and data computation modes.

The operations of the data storage registers of a processing element PE1 at times 4, 5, and 6 will be described in detail.

The data storage register which receives data $w_4$ in the data reception mode at time 4 is switched to the data transmission mode at time 5 and transmits data $w_4$ to a processing element PE2. At time 6, the data storage register is switched to the data computation mode, and is used for multiplication with $x_4$ input at time 4 and held therein.

At time 4, the other two data storage registers respectively serve as a register for multiplication $w_2 x_2$ of $y_1$ (in the data computation mode), and a register for transferring the data $w_3$ input at time 3 to the processing element PE2 (in the data transmission mode).

At time 5, one of these two data storage registers, which is used for the computation of $W_2 X_2$ at time 4 serves as a register for receiving data $w_5$ in the data reception mode, and the other data storage register which transmits the data $w_2$ at time 4 serves as a register for multiplication $w_3 x_3$ of $y_1$ in the data computation mode.

At time 6, the data storage register which receives the data $w_5$ at time 5 serves to transmit data to the processing element PE2 in the data transmission mode, and the data storage register which computes $w_3 x_3$ at time 5 serves to receive null data in the data reception mode. The series of input data X is simultaneously transferred to all the processing elements in sync with the data transfer of the data $W_k$ at respective times.

As described above, in convolution computation, the data reception, data transmission, and data computation processing modes of the present invention can be exclusively and cyclically switched.

With the above arrangement of the data storage areas, component calculation of $y_i$ in each processing element and data transfer among processing elements can be parallelly executed, and computation of $y_i$ can be realized by the parallel pipelined processing without suffering from overhead of data transfer among the processing elements on the array processor.

As the computation results, $y_1$, $y_2$, and $y_3$ are obtained by the processing elements PE1, PE2, and PE3 at times 7, 8, and 9, respectively.

The effect of this embodiment will be quantitatively described. If a time required for receiving and transferring data $w_p (1 \leq p \leq k)$ is given as $t_{tr}$ and a time required for multiplication $w_p x_{i+p-1}$ and adding a calculation result $$\sum_{k=1}^{p} w_k x_i + k - 1$$

and the resultant product is given as $t_p$, a total time T required for obtaining a result $y_i$ is represented by:

$$T = t_0 + \{k + (n + 1 - k)\} \times \max[t_{tr}, t_p] \quad (5)$$
$$= t_0 + (n + 1) \times \max[t_{tr}, t_p]$$

where $t_0$ is a time required for initial data loading, and max[x,y] represents the maximum values of the x and y values.

In convolution computation of this embodiment, since data transfer among the processing elements corresponds to transfer of scalar data, $t_{tr} < t_p$. Therefore, $$T \neq t_0 + (n+1) \times t_p \quad (6)$$

In a conventional technique for serially performing computation and data transfer, a total time T, is represented by:

$$T \neq t_0' + (n+1)(t_p + t_{tr}) \quad (7)$$

From equations (6) and (7), $$\frac{T'}{T} = \frac{t_p + t_{tr}}{t_p} = 1 + \frac{t_{tr}}{t_p} \quad (8)$$

From equation (8), $T<T'$, and the processing speed can be increased by the arrangement of the present invention $(1+t_{tr}/t_p)$ times that of the conventional arrangement.

Embodiment 3

A case will be described wherein vector distance calculation in Dynamic Time Warping of speech recognition is executed using a linear array processor consisting of processing elements (PE) each having the arrangement shown in FIG. 5 and a means for executing the three-state cyclical mode transition control method shown in FIG. 6.

The vector distance calculation (to be referred to as d-calculation hereinafter) is represented by:

$$d_{i,j} = \sum_k ||u_i^k - r_j^k|^2$$

wherein i and j respectively indicate an ith frame of an input pattern data time-series ($|u_i$) to be matched with a jth frame of a reference pattern data time-series ($|r_j$), and k indicates the dimension of each vector data.

A case will be described wherein the d-calculation (where i=5 and j=5) is processed using the linear array processor having five PEs.

Figure 14B:
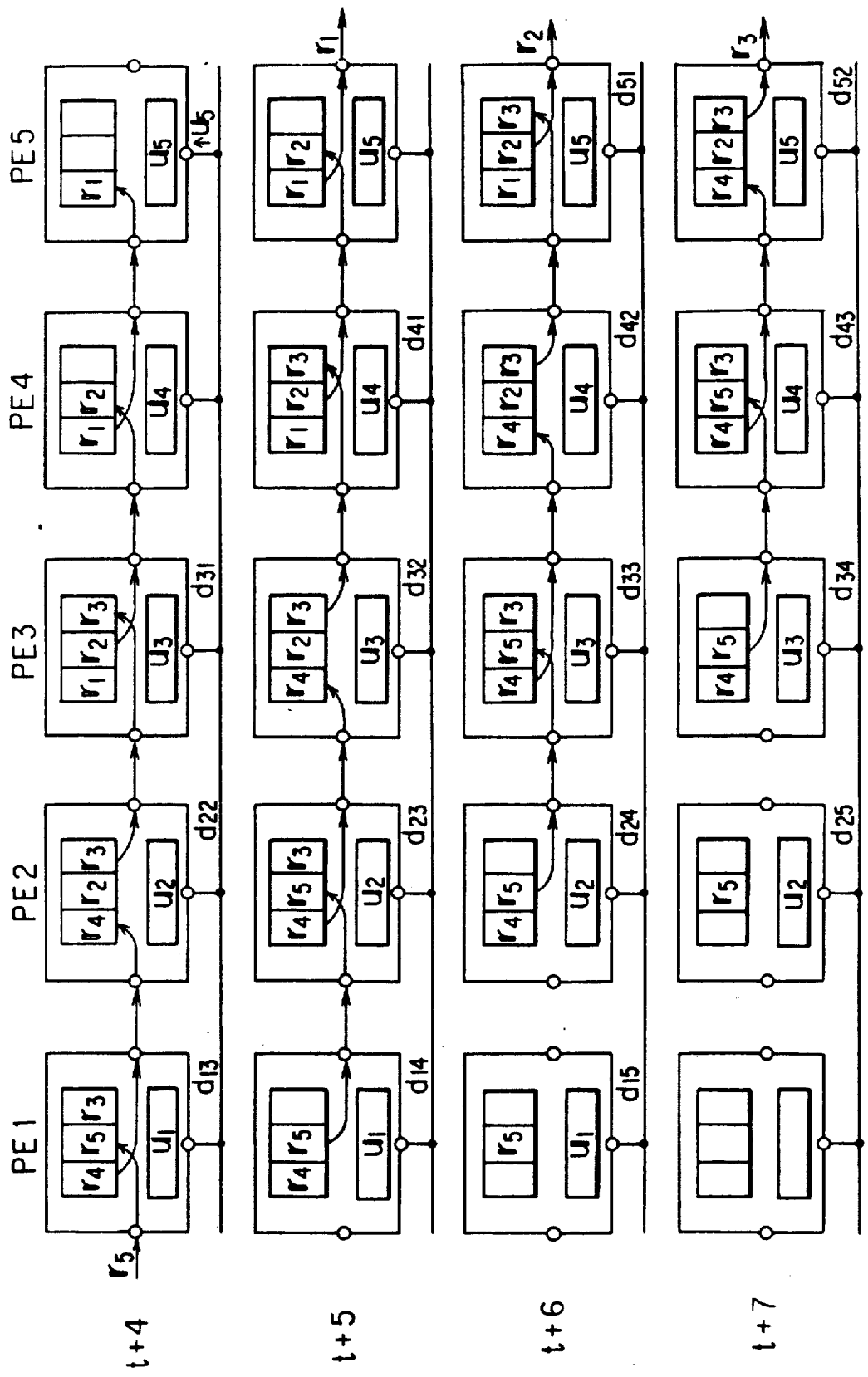
Figure 14C:
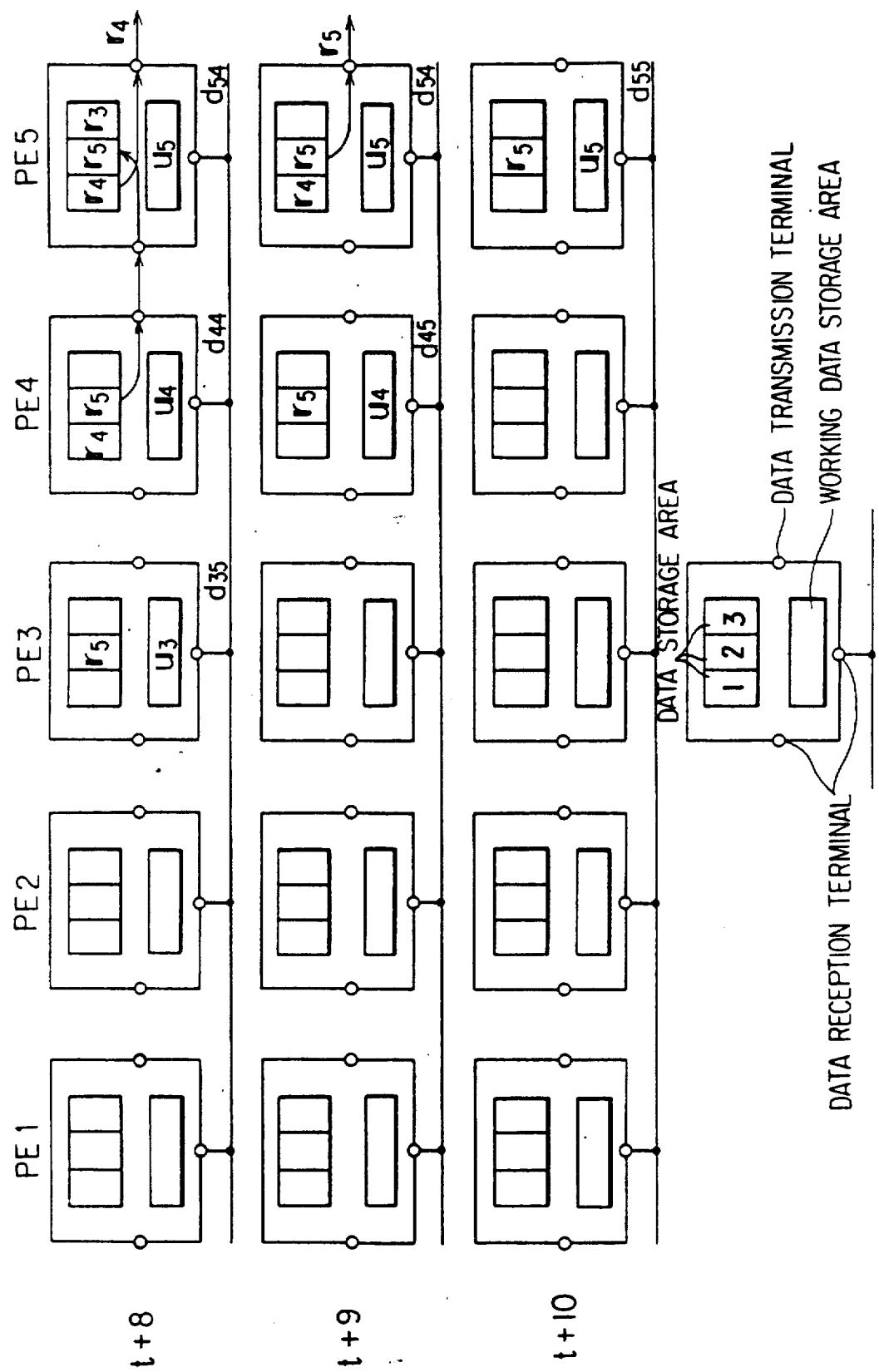

FIGS. 14A, 14B, and 14C show processing flows of the d-calculation executed in the PEs. Each PE has a working data storage area which can perform data exchange with a computation execution unit as well as the three data storage areas, and can receive data from an external bus.

Each PE receives reference pattern data from the bus, stores it in the working data storage area, and receives input pattern data by pipelined processing using the three data storage areas. In this processing flow, a processing time required for one d-calculation is defined as a unit time, and the three data storage areas of each PE are exclusively and cyclically switched in turn of the data reception, data transmission, and data computation modes at each time. Detailed processing will be described with reference to the d-calculation of the PE3 at time t+6.

At time t+6, the PE3 receives reference pattern vector data $|r_5$ from the PE2 in the data storage area of data reception mode, and at the same time, transmits to the PE4 reference pattern vector data $|r_4$ received from the PE2 at time t+5. Parallel to the data transfer among the PEs, the PE3 executes the d-calculation ($d_{33}$) of reference pattern vector data $|r_3$ received at time t+3 and input pattern vector data $|u_3$ received from the bus in the working data storage area at time t+2.

The mode of the three data storage areas of the PE3 are exclusively switched as follows:

| | Mode Transition of Data Storage Area ① : | | |
|---|---|---|---|
| | Data Storage Area Number | | |
| Time | 1 | 2 | 3 |
| t + 4 | Data Computation Mode (Calculation of $d_{31}$) | Data Transmission Mode (Transmission of $|r_2$) | Data Reception Mode (Reception of $|r_3$) |
| t + 5 | Data Reception Mode (Reception of $|r_4$) | Data Computation Mode (Calculation of $d_{32}$) | Data Transmission Mode (Transmission of $|r_3$) |

| | Mode Transition of Data Storage Area ① : | | |
|---|---|---|---|
| | Data Storage Area Number | | |
| Time | 1 | 2 | 3 |
| t + 6 | Data Transmission Mode (Transmission of $|r_4$) | Data Reception Mode (Reception of $|r_5$) | Data Computation Mode (Calculation of $d_{33}$) |

| | Mode Transition of Data Storage Area ③ : | | |
|---|---|---|---|
| t + 6 | Data Transmission Mode (Transmission of $|r_4$) | Data Reception Mode (Reception of $|r_5$) | Data Computation Mode (Calculation of $d_{33}$) |

The PEs execute the same processing at the respective times.

As described above, with the three data storage areas which can be exclusively and cyclically switched to three modes, data transfer processing in each PE can be executed in parallel with data computation processing, and parallel d-calculation of Dynamic Time Warping can be achieved without suffering from overhead of data transfer.

Embodiment 4

In this embodiment, a state A for cyclically and exclusively switching three data storage areas in three modes, i.e., in data reception, data transmission, and data computation modes, and a state B for setting one data storage area in a no-operation state, and setting the other two data storage areas in a data computation write-only mode and a data computation read-only mode, are alternately switched, so that the three data storage areas are selectively and cyclically switched to six states, i.e., the data computation mode (in state A), the data computation write-only mode (in state B), the data transmission mode (in state A), no-operation mode (in state B), the data reception mode (in state A), and the data computation read-only mode (in state B), thereby parallelly executing data reception, data transmission, and data computation processing.

A case will be described wherein cumulative distance calculation in Dynamic Time Warping of speech recognition is executed using a linear array processor consisting of processing elements (PE) each having the arrangement shown in FIG. 5 and a means for executing the six-state cyclical mode transition control method shown in FIG. 15.

The cumulative distance calculation (to be referred to as g-calculation hereinafter) is represented by $$g_{i,j} = d_{i,j} + \min \begin{cases} g_{i-2,j-1} + 2d_{i-1,j} & (1) \\ g_{i-1,j-1} + d_{i,j} & (2) \\ g_{i-1,j-2} + 2d_{i,j-1} & (3) \end{cases}$$

$$l_{i,j} = \begin{cases} l_{i-2,j-1} + k_1 & \text{if (1)} \\ l_{i-1,j-1} + k_2 & \text{if (2)} \\ l_{i-1,j-2} + k_3 & \text{if (3)} \end{cases}$$

where i and j respectively indicate an ith frame of an input pattern data time-series to be matched and a jth frame of a reference pattern data time-series.

A case will be described wherein the g-calculation (where i=5 and j=5) is processed using the linear array processor having five PEs.

Figure 16A:
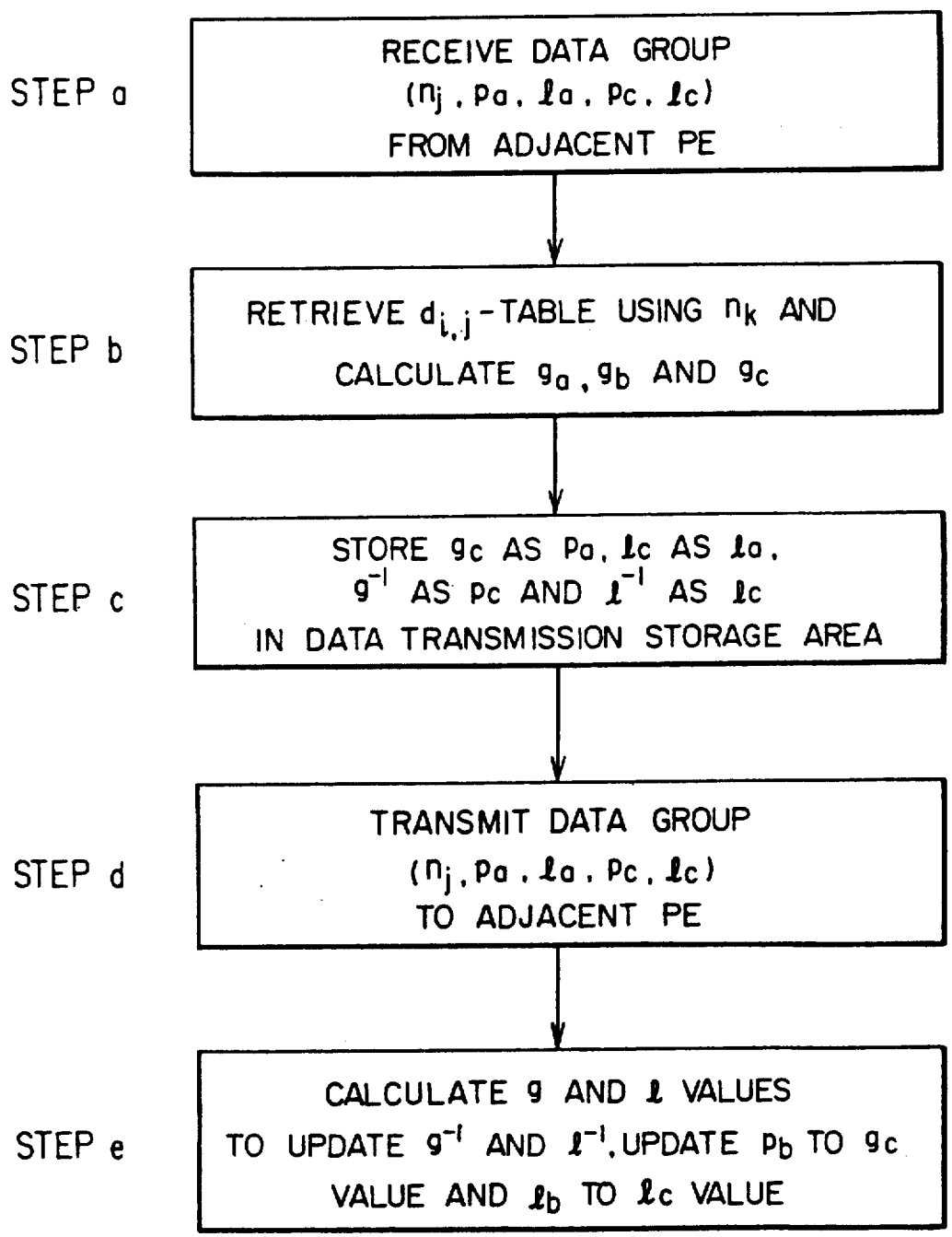
FIG. 16A shows a flow of cumulative distance calculation of Dynamic Time Warping in speech recognition of processing elements (PEs)
Figure 17A:
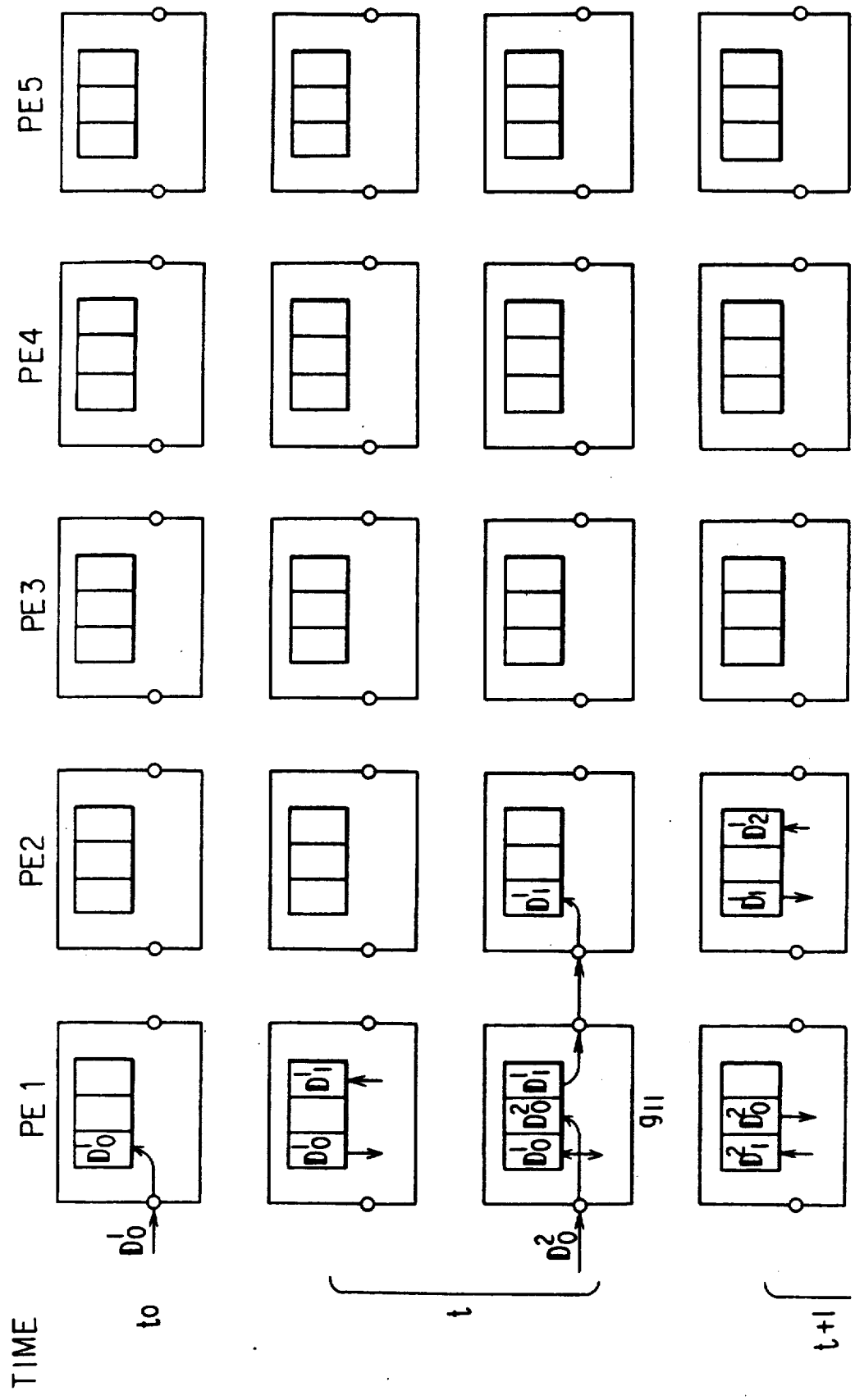
Figure 17B:
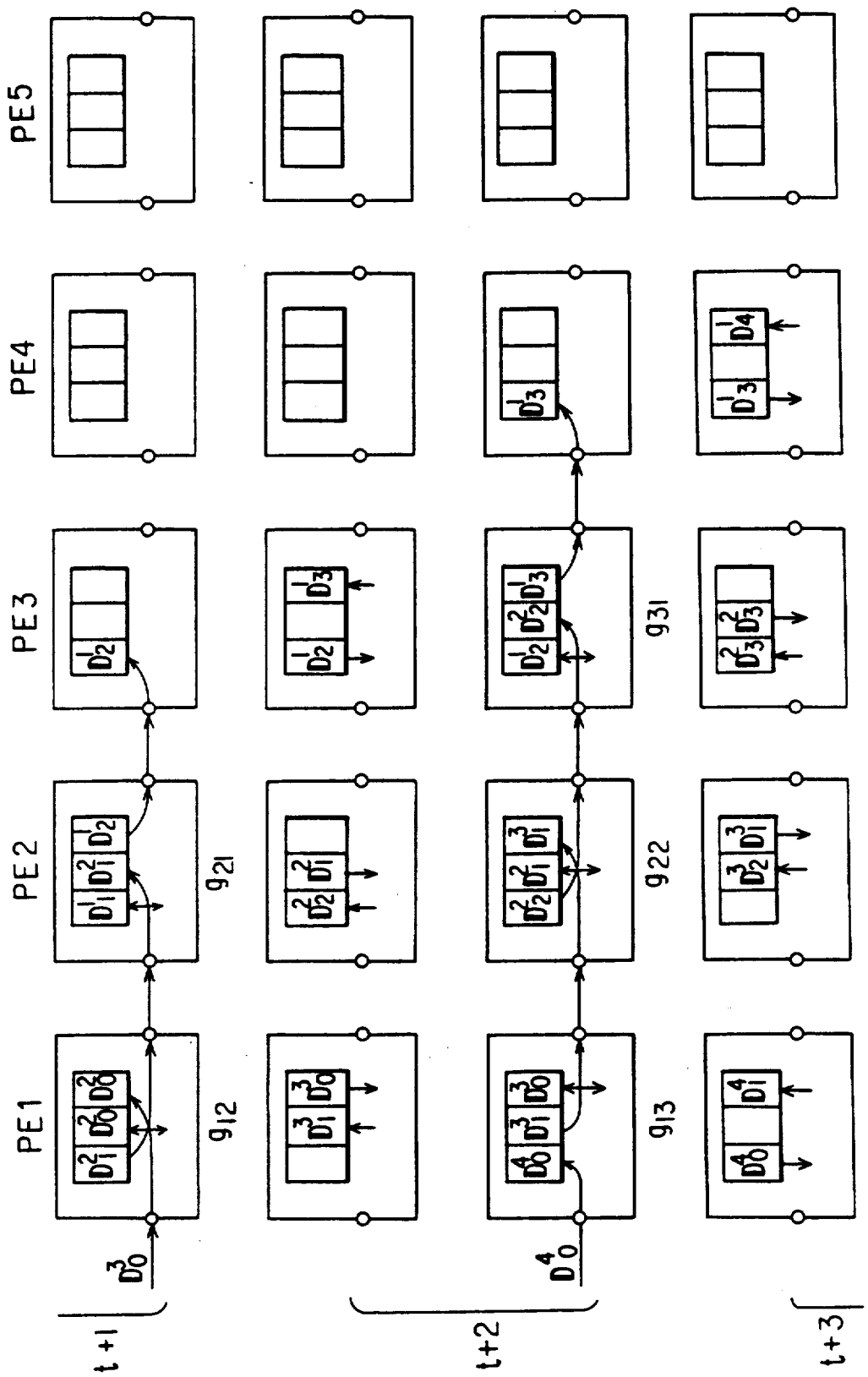
Figure 17C:
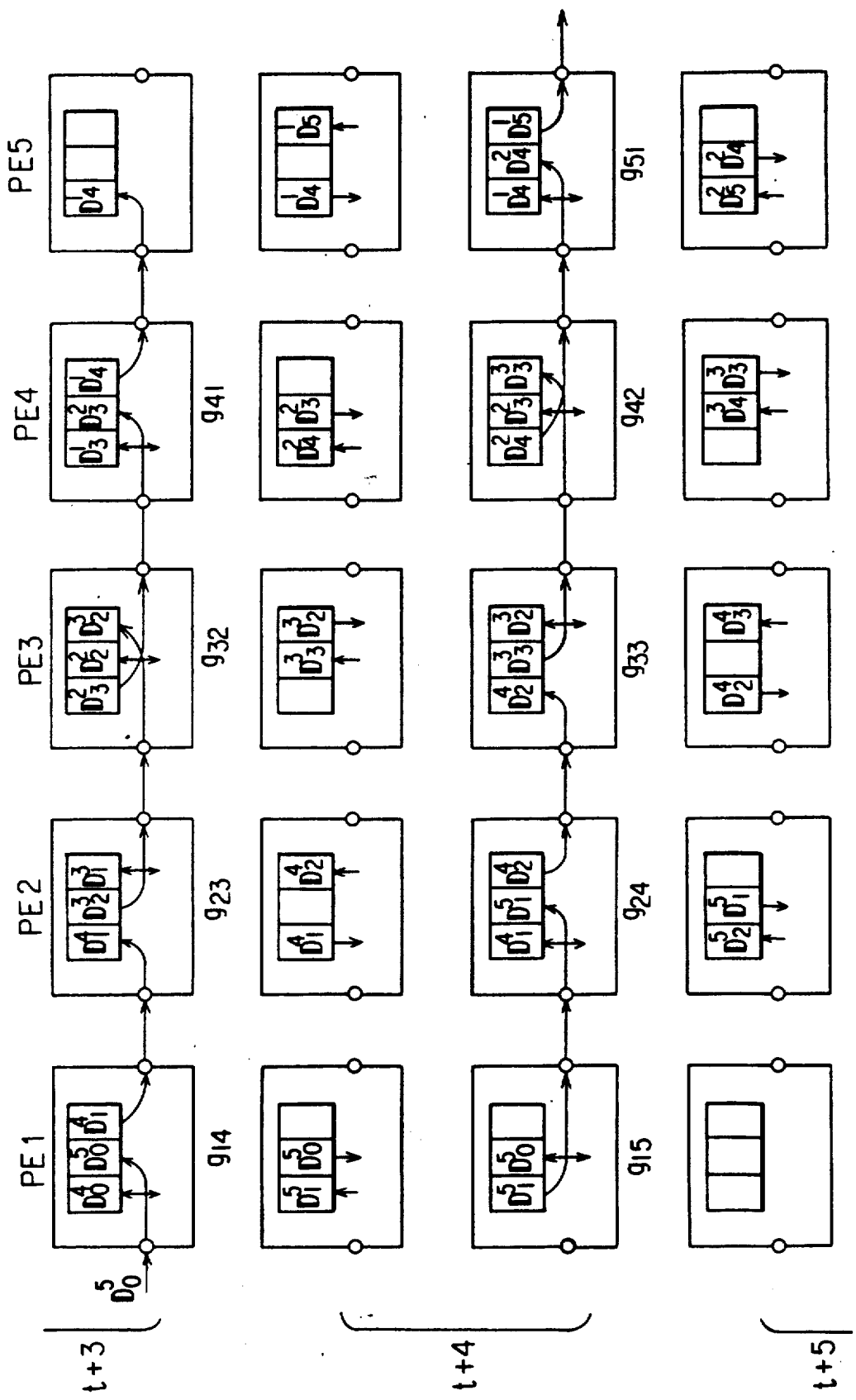
Figure 17D:
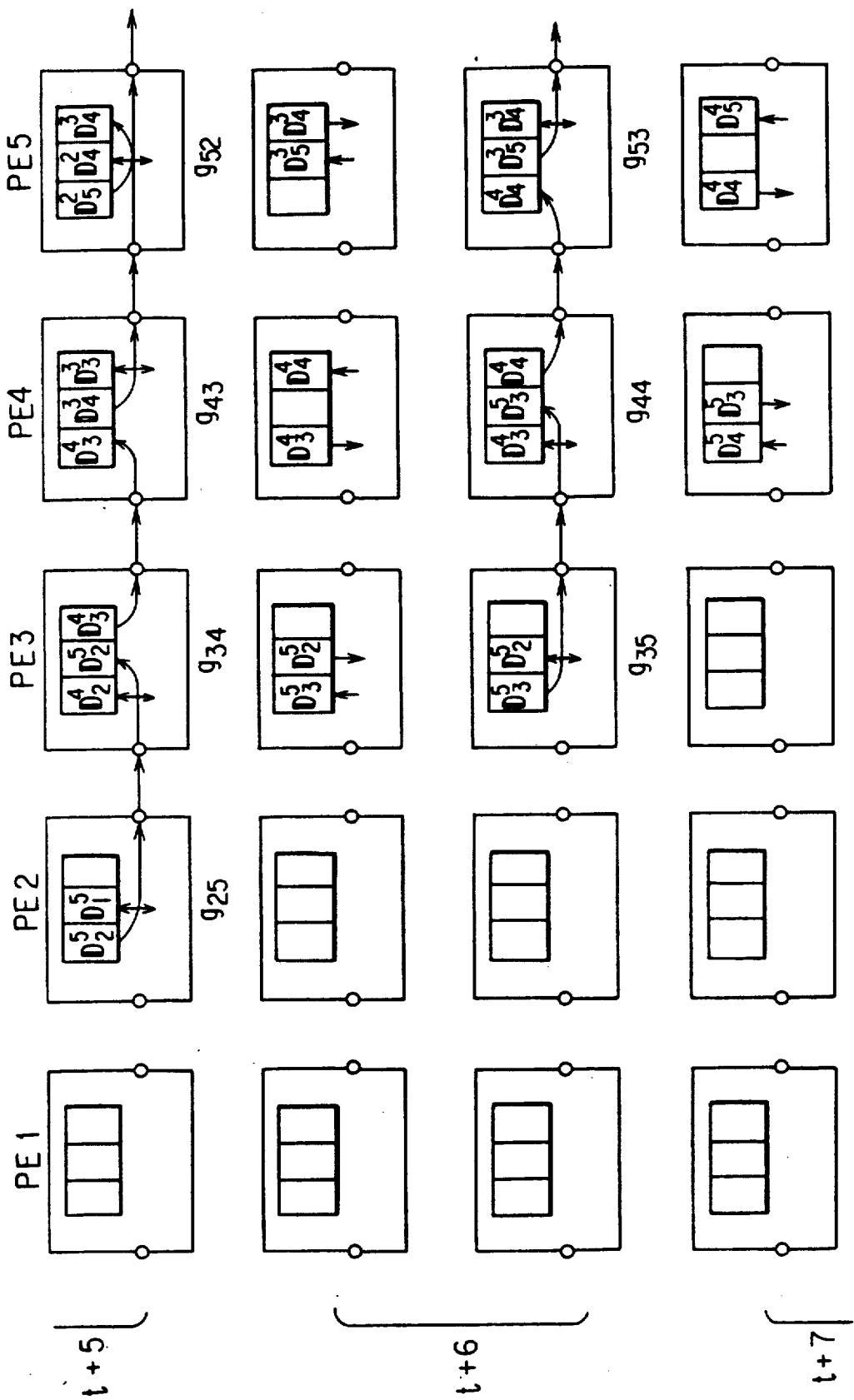

FIG. 16A shows a processing flow of the g-calculation executed in each PE. Each PE has a working data storage area capable of data exchange with a computation execution unit as well as the three data storage areas, and a table for a distance value $d_{i,j}$ is stored in part of the area. In this flow, each PE receives a data group required for its g-calculation from the adjacent PE, and calculates a data group which is required for the g-calculation of the adjacent PE using the data transferred from the adjacent PE and data held in the data storage area. Then, the PE transmits the calculated data group to the adjacent PE. Each PE calculates its g and l values in parallel with this data transmission.

In FIG. 16A, $n_j$: index value to look up the distance value $d_{i,j}$ from the table stored in the storage area.

g, l: g and l values as objects $g^{-1}, l^{-1}$: g and l values of the immediately preceding time $p_a = g_{i-2,j-1} + 2d_{i-1,j}$
$p_b = g_{i-1,j-2} + 2d_{i,j-1}$
$p_c = g_{i-1,j-1}$
$g_a = p_a + d_{i,j}$
$g_b = p_b + d_{i,j}$
$g_c = p_c + 2d_{i,j}$
$l_a = l_{i-2,j-1}$
$l_b = l_{i-1,j-2}$
$l_c = l_{i-1,j-1}$ The data transmission or reception storage area stores data group ($n_j$, $p_a$, $l_a$, $p_c$, $l_c$), and the working data storage area stores data group ($p_b$, $l_b$, $g^{-1}$, $l^{-1}$, $g_a$, $g_b$, $g_c$), and $d_{i,j}$ table.

FIG. 16B shows a parallel processing flow of the g-calculation in the linear array processor in accordance with the processing flow of the PEs. Each PE executes steps a to e in FIG. 16A in accordance with the processing flow in FIG. 16B. Since steps a and d of each PE correspond to steps d and e of its adjacent PE, parallel processing wherein steps a and d are corresponded to each other between the adjacent PEs can be executed in the processing of the array processor. More specifically, inter-PE data transfer can be executed in parallel with data computation FIGS. 17A, 17B, 17C, 17D and 17E show a case wherein the processing flow described above is executed by the arrangement of the present invention.

Note that symbol $|D_{i-1}^j|$ represents a data group, and is defined as:

$|D_{i-1}^j| = (n_j, g_{i-2,j-1} + 2d_{i-1,j} (=p_a), g_{i-1,j-1} (=p_c),$ $l_{i-2,j-1} (=l_a), l_{i-1,j-1} (=l_c))$

FIGS. 17A, 17B, 17C, 17D and 17E show processing flows, in which a time required for calculating one g value in PE is defined as a unit time. Detailed processing will be described the processing of calculation of $g_{33}$ of the PE3 at time t+4.

The three data storage areas of each PE are set in two states, i.e., a state wherein the two storage areas are set in read- and write-only modes for data computation and a state wherein the three storage areas are respectively set in data transmission, data reception, and data computation modes at respective times.

At time t+4, in the PE3, data $|D_2^3|$ received from the PE2 at time t+3 from the read-only data storage area for data computation, is read out, the data ID3 is calculated using both this readout data and the stored data in the working data storage area in the PE3, and this calculated data $ID_3^3$ is stored in the write only data storage area for data computation. Then, the three data storage areas are set in the data transmission, data reception, and data computation modes respectively, so that the calculated data $|D_3^3|$ is transmitted to an adjacent PE from the data storage area in the data transmission mode (which was set in the write-only mode), and at the same time, data $|D_2^4|$ required for the g-calculation at time t+5 is received in the data storage area in the data reception mode. In parallel thereto, $g_{33}$ and $l_{33}$ are calculated using the data from the data storage area in the data computation mode (which was set in a read-only mode) and the data from the working data storage area, thus completing g and l calculations at time t+4.

Since $|D_2^3| = (n_3, g_{12} + 2d_{23}, g_{22}, l_{12}, l_{22})$ and the working data storage area stores $g_{21} + 2d_{32}$ and $l_{21}$, data $g_{33}$ and $l_{33}$ can be calculated from these data.

At each time, the PEs execute the same processing as described above.

The above processing in each PE is executed using the three data storage areas which are cyclically used in the six modes, so that data transfer processing can be executed in parallel with data computation processing. Therefore, parallel cumulative distance calculation of Dynamic Time Warp free from the overhead due to data transfer ca be realized.

What is claimed is:

1. A data processing apparatus comprising:

three data storage means each for receiving data and for reading out the received data;

one data input terminal to receive data from an external apparatus and one data output terminal to transmit data to a different external apparatus;

a computation execution unit having means for executing predetermined computations and storing means for storing computation results produced in said computation execution unit;

a first buffer register connected to said input terminal so that data from said external apparatus are input to said first buffer register through said input terminal;

a second buffer register connected to said output terminal so that data from said second buffer register are output to said different external apparatus through said output terminal;

said three data storage means each having an output port to read out data and an input port to receive data;

first and second switch means each connected to each of said output ports of said three data storage means;

said first switch means having an output connected with said second buffer register;

said second switch means having an output connected with said computation execution unit;

third, fourth, and fifth switch means connected to outputs of said first buffer register and said computation execution unit;

said third, fourth, and fifth switch means having outputs connected to the input ports of said three data storage means, respectively, a control unit operatively coupled to said three data storage means, said first, second, third, fourth and fifth switch means, said first and second buffer registers and said computation execution unit and including means for controlling said first, second, third, fourth, and fifth switch means to select paths of connection between the three data storage means, the computation execution unit, and the first and second buffer registers, means for controlling computation operations of said computation execution unit, means for controlling read and write operations of said three data storage means, and means for controlling said first buffer register and said common buffer register to store data;

said control unit controlling data input processing in which said first buffer register stores data from said external apparatus through said input terminal and one of said three data storage means receives data from said first buffer register through one of said third, fourth, and fifth switch means, said control unit controlling data output processing in which said second buffer register stores data read out from one of said three data storage means through said first switch means and data stored in said second buffer register are output to said different external apparatus through said output terminal, said control unit controlling data computation processing in which data read out from one of said three data storage means are transferred to said computation execution unit through said second switch means, said computation execution unit carries out computation operations using data which are transferred from said one of said three data storage means through said second switch means, and the computation results are selectively output to said one of said three data storage means through said one of said third, fourth, and fifth switch means or to said storing means.

2. The data processing apparatus as claimed in claim 1 wherein each of said three data storage means has three modes of operation including a data reception mode, a data transmission mode, and a data computation mode, and wherein:

in said data reception mode one of said three data storage means receives data through one of said third, fourth, or fifth switch means, said first buffer register, and said input terminal from said external apparatus;

in said data transmission mode one of said three data storage means transmits memorized data in this data storage means through said first switch means, said second buffer register, and said output terminal to said different external apparatus;

in said data computation mode one of said three data storage means supplies data in this data storage means to said computation execution unit through said second switch means and the computation results of said computation execution unit are stored in said storing means;

the mode of operation of each of said three data storage means being changed in the following stages;

(1) initially, said control unit sets one of said three data storage means in the data reception mode while the other two data storage means are set in said data transmission mode and said data computation mode, respectively, to carry out in said one data storage means data reception from said external apparatus and to carry out data transmission to said different external apparatus from the data storage means in said data transmission mode in parallel with said computation execution in which the data storage means in said data computation mode supplies data to said computation execution unit;

(2) after parallel processing of said data reception, said data transmission, and said computation execution in all of said three data storage means said control unit switches the modes of operation of each of said three data storage means so that the mode of the data storage means which was in said data computation mode is switched to said data reception mode, the mode of the data storage means which was in said reception mode is switched to said data transmission mode, and the mode of the data storage means which was in said data transmission mode is switched to said data computation mode, to carry out simultaneously data reception from said external apparatus into the data storage means in said data reception mode, data transmission to said different external apparatus from the data storage means in said data transmission mode, and computation execution in which the data storage means in said data computation mode supplies data to said computation execution unit and the computation results from said computation execution unit are supplied to said storing means;

(3) afterwards, stage (2) is carried out repeatedly.

3. The data processing apparatus as claimed in claim 1, wherein said control unit provides six operation modes for each of said three data storage means comprising a data reception mode, a data transmission mode, a data computation mode with read and write functions, a data computation mode with read-only function, a data computation mode with write-only function, and a non-operation mode, and wherein:

in said data reception mode one of said three data storage means receives data from said external apparatus via said input terminal, said first buffer register, and one of said third, fourth, and fifth switch means;

in said data transmission mode one of said three data storage means transmits memorized data in this data storage means to said different external apparatus via said first switch means, said second buffer register and said output terminal;

in said data computation mode with read and write functions one of said three data storage means supplied data from this data storage means to said computation execution unit through said second switch means and the computation results from said computation execution unit are stored in said storing means;

in said data computation mode with read-only function one of said three data storage means supplies data from this data storage means to said computation execution unit through said second switch means;

in said data computation mode with write-only function one of said three data storage means receives computation results from said computation execution unit through one of said third, fourth, and fifth switch means;

in said no-operation mode one of said three data storage means does not effect any processing:

the operation mode of each of said three data storage means being circularly changed in the following sequence:

(1) initially, said control unit sets one of said three data storage means in said data reception mode and the other two data storage means respectively in said data transmission mode and said data computation mode with read and write functions to carry out simultaneously data reception from said external apparatus into the data storage means in said data reception mode, data transmission to said different external apparatus from the data storage means in said data transmission mode, and computation execution in which the data storage means in said data computation mode with read and write functions supplies data to said computation execution unit;

(2) after parallel processing of said data reception, said data transmission, and said data computation execution in all of said three data storage means, said control unit switches each of said three data storage means so that the data storage means which was in said data reception mode is switched to said data computation mode with read-only function, the data storage means which was in said data computation mode with read and write functions is switched to said data computation mode with write-only function, and the data storage means which was in said data transmission mode is switched to said no-operation mode, to carry out simultaneously computation execution in which the data storage means in said data computation mode with read-only function supplies data from said this data storage means to said data computation execution unit and computation data from said storing means is supplied to the data storage means in said data computation mode with write-only function;

(3) after parallel processing of data supply to said computation execution unit from the data storage means in said data computation mode with read-only function and reception of computation results from said storing means to the data storage means in said computation mode with write-only function from said computation execution unit, said control unit switches the operation mode of each of said three data storage means so that the data storage means which was in said data computation mode with read-only function is switched to said data computation mode with read and write functions, the data storage means which was in said data computation mode with write-only function is switched to said data transmission mode, the data storage means which was in said no-operation mode is switched to said data reception mode, to carry out simultaneously data reception in the data storage means in said data reception mode from said external apparatus, data transmission to said different external apparatus from the data storage means in said data transmission mode, and computation execution in which the data storage means in said computation mode with read and write functions supplies data to said computation execution unit and the computation results from said computation execution unit are stored in said storing means;

(4) afterwards, said step (2) and said step (3) are carried out one after the other.

* * * * *